INVENTOR.
Robert B. Trousdale

BY T. L. Bowes

Att'y

March 31, 1959 R. B. TROUSDALE 2,880,274

TELEPHONE SYSTEM

Filed Feb. 24, 1953 16 Sheets-Sheet 2

INVENTOR.
Robert B. Trousdale
BY
T. C. Bowen
Att'y

INVENTOR.

Robert B. Trousdale

BY J. L. Bowes

Att'y

March 31, 1959 R. B. TROUSDALE 2,880,274

TELEPHONE SYSTEM

Filed Feb. 24, 1953 16 Sheets-Sheet 4

INVENTOR.
Robert B Trousdale
BY T. L. Bowes
Atty

INVENTOR
Robert B. Trousdale
BY T. L. Bowes
Att'y

INVENTOR.
ROBERT B. TROUSDALE
BY
T. L. Bowes
ATTORNEY

INVENTOR.
ROBERT B. TROUSDALE
BY
T. L. Bowes
ATTORNEY

INVENTOR.
ROBERT B. TROUSDALE
BY
T. L. Bowes
ATTORNEY

INVENTOR.
ROBERT B. TROUSDALE
BY
T. L. Bowes
ATTORNEY

March 31, 1959 R. B. TROUSDALE 2,880,274

TELEPHONE SYSTEM

Filed Feb. 24, 1953 16 Sheets-Sheet 10

INVENTOR.
ROBERT B. TROUSDALE
BY
T. L. Bowes
ATTORNEY

March 31, 1959 R. B. TROUSDALE 2,880,274

TELEPHONE SYSTEM

Filed Feb. 24, 1953 16 Sheets-Sheet 11

INVENTOR.
ROBERT B. TROUSDALE
BY
T. L. Bowes
ATTORNEY

INVENTOR.
ROBERT B. TROUSDALE
BY
T. L. Bowes
ATTORNEY

INVENTOR.
Robert B. Trousdale
BY T. L. Bowes
Att'y

March 31, 1959 R. B. TROUSDALE 2,880,274

TELEPHONE SYSTEM

Filed Feb. 24, 1953 16 Sheets-Sheet 14

INVENTOR.
Robert B. Trousdale
BY T. L. Bowes
Att'y

March 31, 1959 R. B. TROUSDALE 2,880,274

TELEPHONE SYSTEM

Filed Feb. 24, 1953 16 Sheets-Sheet 15

INVENTOR.
Robert B. Trousdale
BY T. L. Bowes
Att'y

INVENTOR.
Robert B. Trousdale
BY T. L. Bowes
Att'y

United States Patent Office 2,880,274
Patented Mar. 31, 1959

2,880,274

TELEPHONE SYSTEM

Robert B. Trousdale, Webster, N.Y., assignor, by mesne assignments, to General Dynamics Corporation, a corporation of Delaware Application February 24, 1953, Serial No. 338,204
15 Claims. (Cl. 179—15)

This invention relates to improved apparatus for setting up private two-way communication connections between the lines of an automatic telephone system, and, more particularly, to an improved apparatus in which auxiliary common equipment is provided for insuring continuous service in said automatic telephone system. This application relates to improvements in the systems disclosed and claimed in the copending applications of Frank A. Morris and Robert B. Trousdale, Serial No. 134,974, filed December 24, 1947, now Patent No. 2,773,934, and Robert B. Trousdale, Serial No. 301,215, filed July 28, 1952, both of which applications are assigned to the same assignee as the present application.

Many types of automatic switching apparatus have been proposed and developed for transmitting signals between the lines of telephone, telegraph and other communication systems. In the main, the apparatus proposed and developed for this purpose utilizes electromechanical devices embodying moving mechanical parts, such, for example, as relays, stepping switches and the like, to perform the line selecting, line interconnecting and ancillary functions required in selectively interconnecting any two lines of a large group of lines. While apparatus of this type and embodying switching devices of various forms have been developed to provide thoroughly reliable service, it is inherently subject to several limitations, including that of insufficient operating speed. To overcome these limitations various proposals have been made for utilizing electronic facilities, such, for example, as cathode ray tubes, for the purpose of transmitting signals between the lines of a signaling system on a selective basis. However, most if not all of these proposals are limited to arrangements for providing one-way signal transmission between two lines.

In the above systems disclosed in the above-identified copending applications, a system of multiplexing, namely pulse sampling effectively at an ultrasonic rate of the control and intelligence signals produced at each substation of the system, is utilized to provide signal channel separation. Specifically, each line or substation of the system is assigned a particular pulse time position in each of repetitive pulse frames each comprising one hundred pulse time positions. Intelligence and control signals developed at any one substation of the system are sampled only in the particular pulse time position assigned to the particular substation and the samples are carried through the signal transmitting linkage of the system as far as the connector stage on multiplexer signal pulses occurring in this particular time position. In the connector stage the control or intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation.

While this system is entirely satisfactory in operation, it is dependent upon the continuous and accurate production of a plurality of pulses for control purposes and for the transmission of intelligence. If for any reason the common equipment utilized for the generation of these pulses becomes incapable of producing one or more of the necessary pulses, the operation of the system is interrupted.

Accordingly, it is an object of the present invention to provide an electronic telephone system of the pulse multiplex type wherein telephonic connections are maintained despite cessation of one or more of the pulse generating means employed to set up the connections.

It is another object of the present invention to provide means for automatically connecting auxiliary pulse generating equipment to an automatic telephone system when any of the normally operative pulse generating means are rendered wholly or partially ineffective.

A further object of this invention resides in the provision of an automatic telephone system including normally operative pulse generating equipment and an additional group of pulse generating means which are normally rendered inoperative and which are capable of being rendered effective in response to the failure of one or more of the normally operative generating means.

Another object of the present invention resides in the provision of pulse responsive means for setting up telephonic connections between different lines of a telephone system and means for preventing the pulse responsive means from releasing the connection in response to cessation of the controlling pulses.

Many other objects and advantages of the present invention will be understood from a consideration of the following specification when taken in conjunction with the drawings in which:

Figs. 1, 2, 3, and 4 are schematic diagrams of an automatic telephone system embodying the present invention;

Fig. 5 is a block diagram showing the manner in which Figs. 1 to 4, inclusive, are positioned adjacent each other to form a single schematic circuit diagram;

Figs. 2A and 2B, when laid end to end in the order named, diagrammatically illustrate the components of one of the finder-connector links embodied in the system shown in Figs. 1 to 4, inclusive;

Figs. 6 to 9, inclusive, are circuit diagrams of a group of pulse generating means utilized in the automatic telephone system shown in Figs. 1 to 4, inclusive of the drawings;

*General description of the system*

Figure 4:
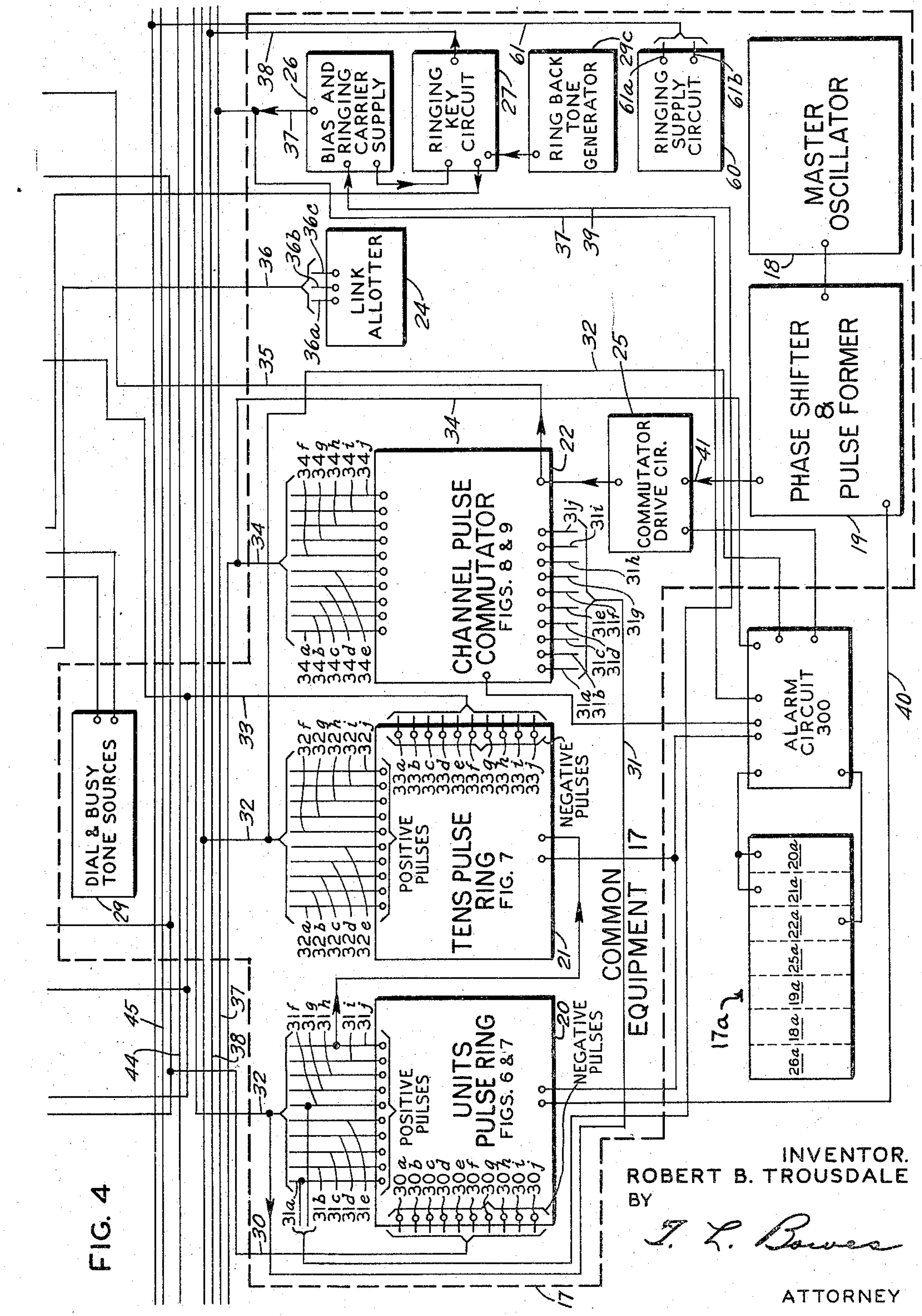
Figure 12:
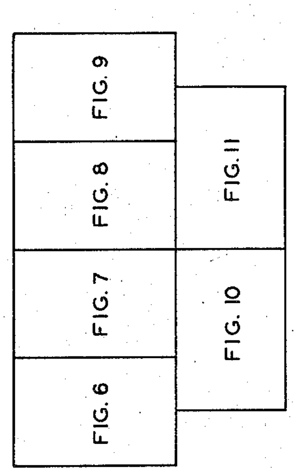
Fig. 12 is a block diagram showing the manner in which Figs. 6 to 11, inclusive, are positioned adjacent each other to form a composite circuit diagram.
Figure 5:
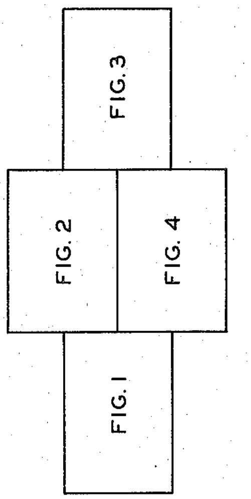

Referring now to the drawings and, more particularly, to Figs. 1, 2, 3, and 4 thereof, the present fully automatic electronic telephone system is there illustrated as comprising line circuits 10, 16, etc., individual to the one hundred lines of the system, a multiplexer 11 of which only one is required in the system, a plurality of identical finder-connector links 12, 13, and 14, a distributor 15 of which only one is required in the system, and the common equipment indicated generally at 17 in Fig. 4 of the drawings. Each of the finder-connector links is comprised of a finder and a connector, the illustrated links respectively comprising finders 12*a*, 13*a*, and 14*a* and connectors 12*b*, 13*b*, and 14*b*. It will be understood that the number of finder-connector links employed in the system may be chosen as required to handle the traffic. Although only three links 12, 13, and 14 have been illustrated, from seven to ten links will normally be required in actual practice to handle the traffic of a one hundred line exchange. Inclusion of the additional links in the system may easily be accomplished by connecting appropriate terminals of additional links to the indicated multiple points. Actually, only twenty-seven multiple connections and one individual connection are required in order to add one finder-connector link to the system. This is in contrast with conventional step-by-step and all-relay type systems wherein more than six hundred multiple connections are normally required to put a single added link into service.

As shown, the line circuits 10 and 16, respectively, terminate two two-conductor lines which are respectively identified by their directory number designations 23 and 32 and extend to the substations A and B, respectively. Each line circuit performs the functions of repeating intelligence or control signals from its associated substation to a corresponding one of the gate circuits in the multiplexer 11, repeating intelligence signals derived from a particular gate circuit of the distributor 15 to its associated substation, and of responding to ring start signals derived from one of the connectors 12*b*, 13*b*, or 14*b* by way of the distributor 15 to transmit ringing current to the associated substation on a call incoming thereto. To perform these functions, the line circuit 10 is connected by way of a conductor 53 to one of the gate circuits provided in the multiplexer 11, and is connected by way of the conductors 44*a* and 44*b* forming the illustrated cable 44 to one of the gate circuits provided in the distributor 16. The line circuit 10 is also connected to certain components of the common equipment 17 in the manner described below. Similarly, the line circuit 16 is connected by way of the conductors 54*a* and 54*b* to one of the gate circuits in the distributor 15 and by way of the conductor 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and distributor 15 and on a common basis to certain components of the common equipment 17.

Generally speaking, he multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13, and 14. To this end, the output terminals of the multiplexer 11 are connected by way of the common conductor 50 to the multiplexer input terminals of each of the finders 12*a*, 13*a*, and 14*a* and also to the multiplexer input terminals of each of the connectors 12*b*, 13*b*, and 14*b*. In reverse manner, the distributor 15 performs the function of repeating intelligence and control signals derived from the connectors 12*b*, 13*b*, and 14*b* inpulse time positions corresponding to particular calling and called lines to the line circuits respectively terminating the lines. To this end, the input terminals of the distributor are connected by way of the common conductor 51 to the output terminals of each of the connectors 12*b*, 13*b*, and 14*b*. In performing the described functions, the multiplexer 11 and the distributor 15 are controlled by certain components of the common equipment 17 in the manner hereinafter explained.

Figure 1:
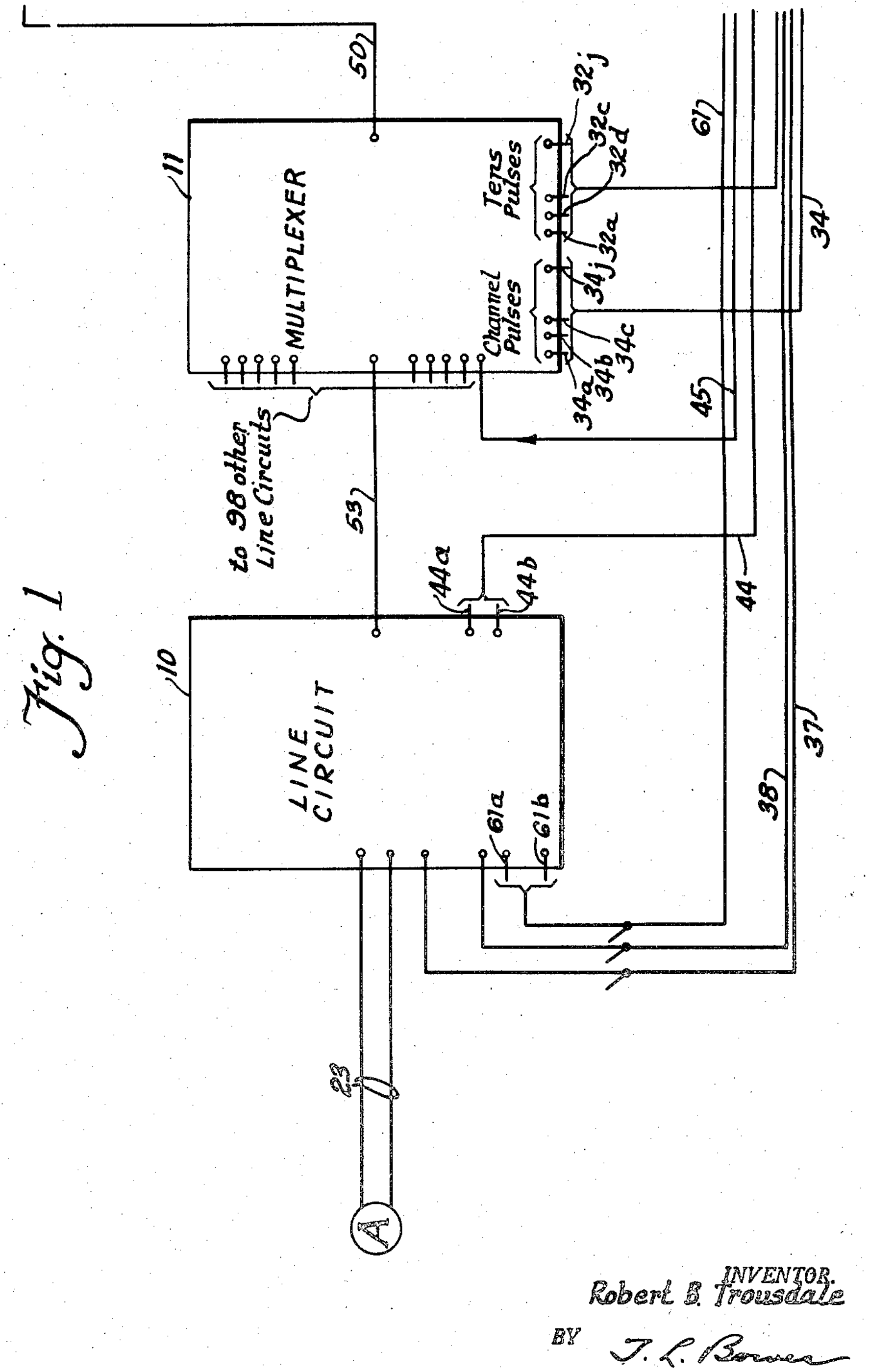
Figure 2:
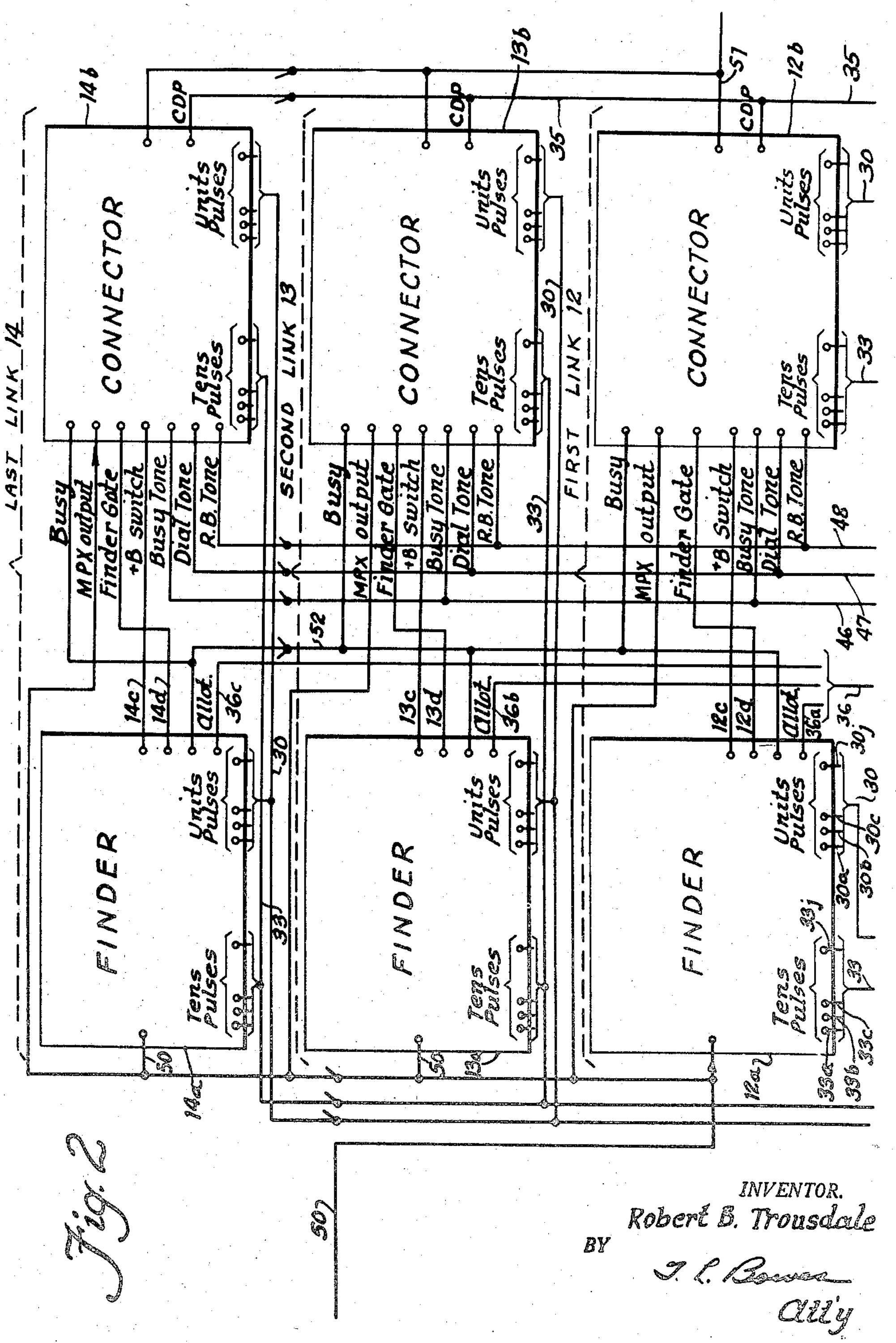
Figure 2A:
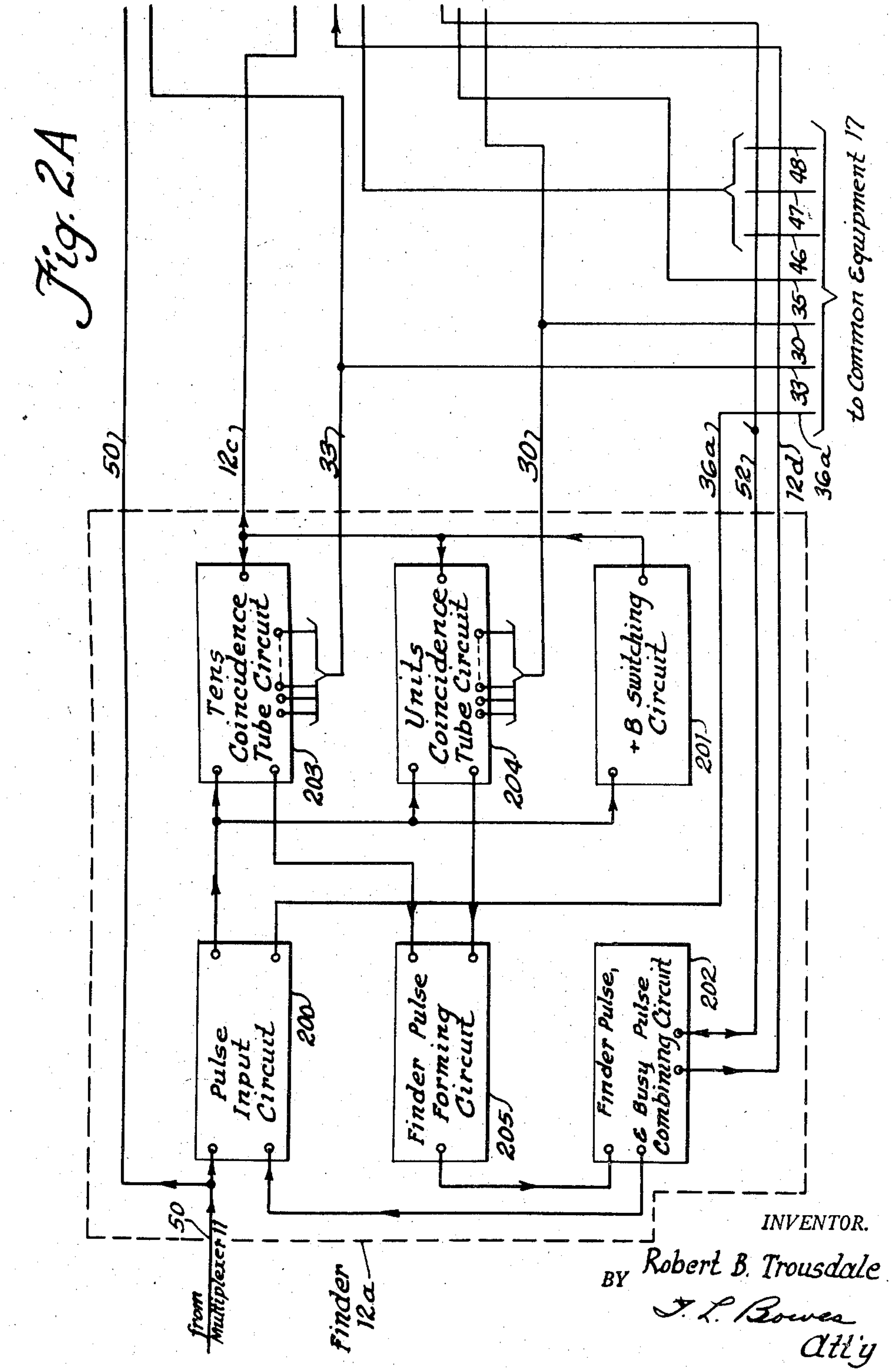
Figure 15:
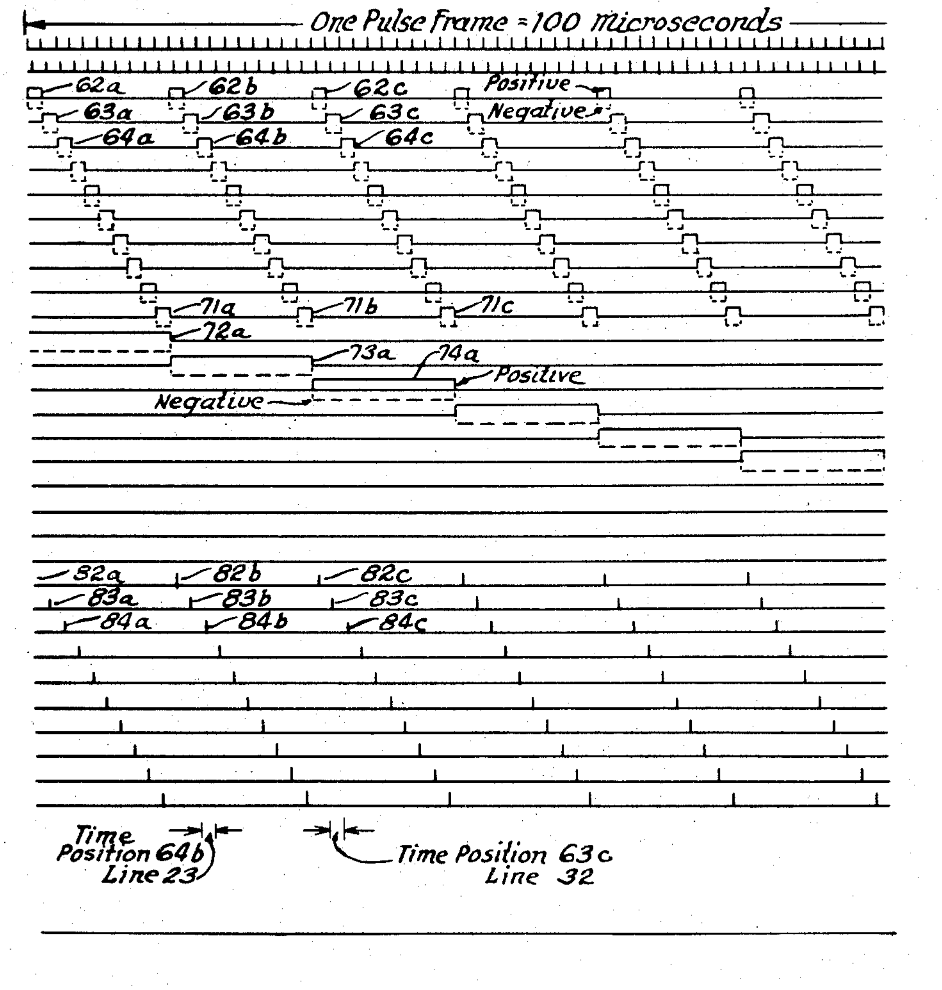
Figure 16:
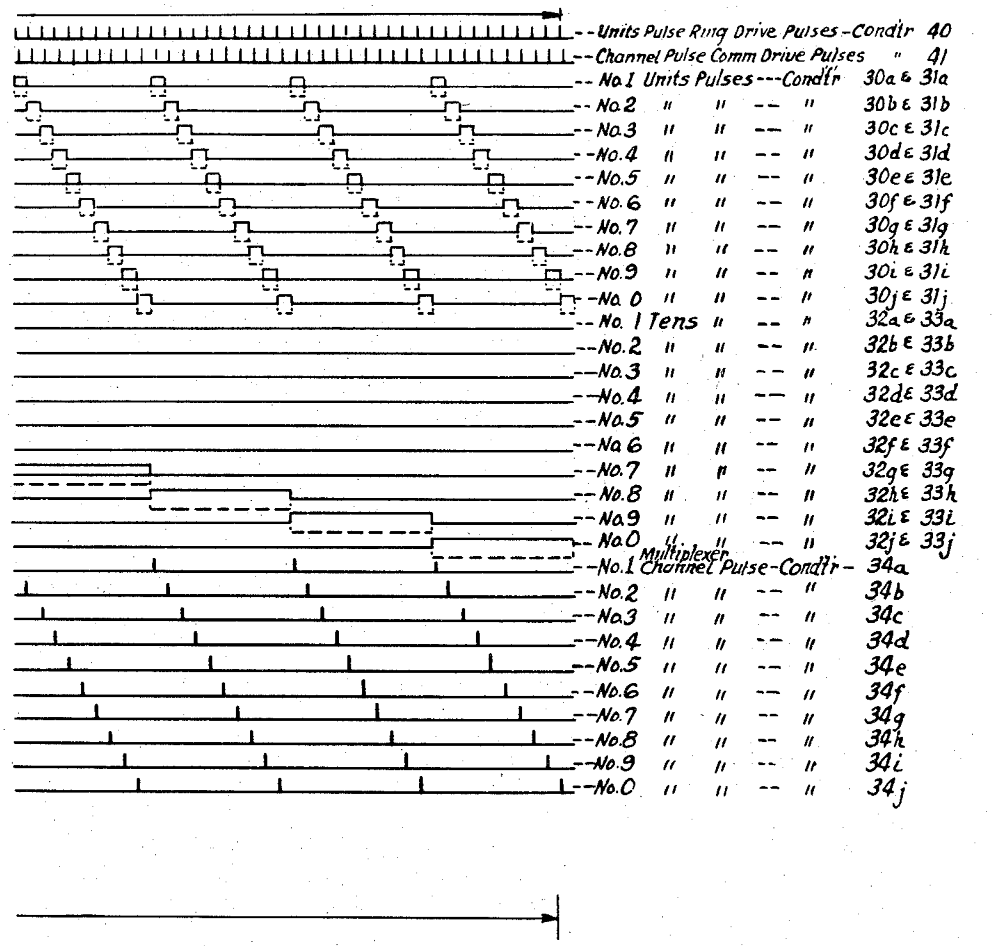

The finders of the various links, such, for example, as the finder 12*a*, do not perform any intelligence transmission functions. On the contrary, they function strictly as control units. Specifically, the finder 12*a* is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and in the associated connector 12*b*. To advise the connector of the pulse time position assigned to the calling line, the finder 12*a* transmits finder gate pulses to the connector in this pulse time position over the conductor 12*d*. The finder 12*a* also performs the function of conditioning its associated connector 12*b* for operation when the link 12 is definitely associated with a calling line to handle the call initiated on the line. This is accomplished through operation of the finder 12*a* to impress operating anode potentials upon a plurality of the tubes in the connector 12*b* over the +B switch conductor 12*c*. When operatively associated with a particular calling line, the finder 12*a* also performs the function of guarding the calling line against intrusion on an incoming call to the line. This is accomplished through operation of the finder 12*a* to feed busy pulses occurring in the particular pulse time position assigned to the calling line with which the finder is operatively associated to a common busy conductor 52 which is multipled to each of the finders and connectors of the system. To perform the above functions in the manner fully explained below, the finder 12*a* comprises (see Figs. 2A, 15 and 16) a pulse input circuit 200, a +B switching circuit 201, a pulse combining circuit 202, tens and units coincidence tube cricuits 203 and 204, and a finder pulse forming circuit 205. It will be noted that the finder 12*a* and connector 12*b* are connected on an individual link basis by only two conductors, namely the +B switch conductor 12*c* and the finder gate pulse conductor 12*d*. The finder 13*a* and connector 13*b* of the link 13 are similarly connected on an individual link basis by means of the finder gate and +B switch conductors 13*d* and 13*c* which respectively correspond to the conductors 12*d* and 12*c* of the link 12. Similarly the finder gate and +B switch conductors 14*d* and 14*c* are provided to connect the finder 14*a* and connector 14*b* of the link 14.

Each of the connectors 12*b*, 13*b*, and 14*b* performs a plurality of different functions. Thus the connector 12*b*, for example, is controlled by finder gate pulses delivered thereto over the conductor 12*d* to accept and respond to signal bearing multiplexer pulses occurring in the pulse time position corresponding to the calling line with which the link is associated. It also responds to the application of operating anode potential to the conductor 12*c* and to the finder gate pulses appearing on the conductor 12*d* to feed a dial tone signal to the distributor 15 on connector signal pulses occurring in the pulse time position assigned to the calling line with which it is operatively associated, thereby to return the usual dial tone signal to the calling subscriber. This connector 12*b* also responds to dial pulses (two digits) originating at the calling line with which the link 12 is operatively associated to select the particular pulse time position assigned to the called line. Incident to the selection of this time position, the connector 12*b* conditions itself to accept signal carrying pulses from the multiplexer 11 which occur in the pulse time position corresponding to the selected called line, to store the intelligence carried by these pulses, and to retransmit the intelligence to the distributor 15 on connector signal pulses occurring in the pulse time position corresponding to the calling line with which the link 12 is operatively associated. In effect, therefore, the connector functions to shift signal carrying pulses from the pulse time position assigned to the calling line to the pulse time position assigned to the called line, and also to shift return signal pulses carrying intelligence derived from the called line from the particular pulse time position assigned to the called line to the particular pulse time position corresponding to the calling line. In addition, the connector **12*b* performs the auxiliary functions of terminating dial tone transmission to the calling substation when the first line selecting impulse is dialed into the connector; feeding busy pulses to the busy conductor 52 in the pulse time position assigned to the called line, thereby to guard the called line against seizure through another link; testing the pulse time position assigned to the called line to determine the idle or busy condition of that line; transmitting busy tone carrying pulses to the distributor 15 in the pulse time position assigned to the calling line in the event the called line tests busy, transmitting a ring start signal by way of the distributor 15 to the line circuit terminating the called line in the event the called line tests idle, concurrently transmitting ring-back tone modulated pulses to the distributor 15 in the pulse time position assigned to the calling line, thereby to signal the calling subscriber that the called substation is being rung; and terminating the ring start signal and concurrently terminating ring-back tone signal transmission to the calling substation in response to answering of the call at the called substation. The connector 12*b* is also arranged to release in response to the release of a connection involving the link 12** at the calling substation.

Figure 2B:
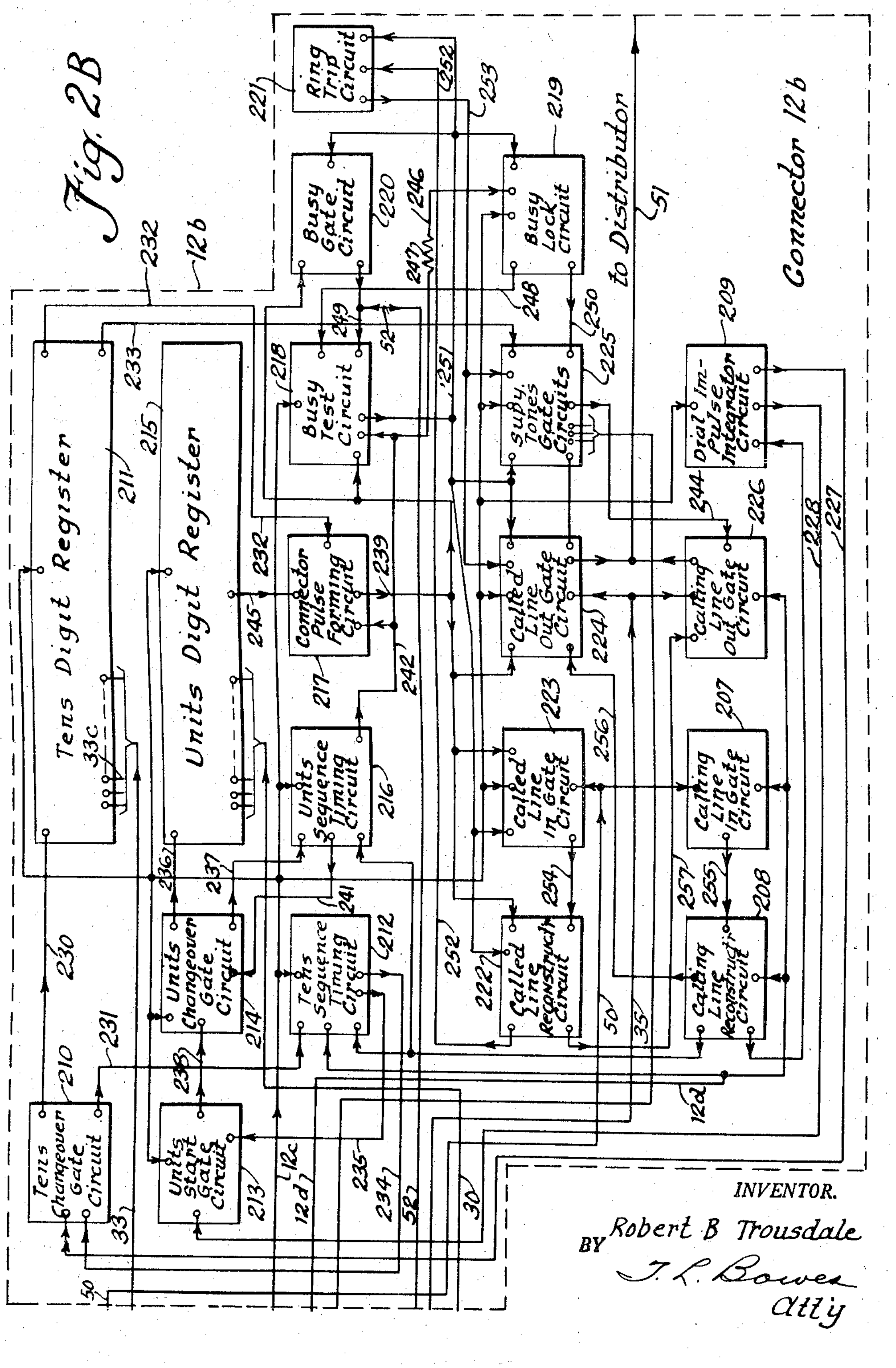
Figure 3:
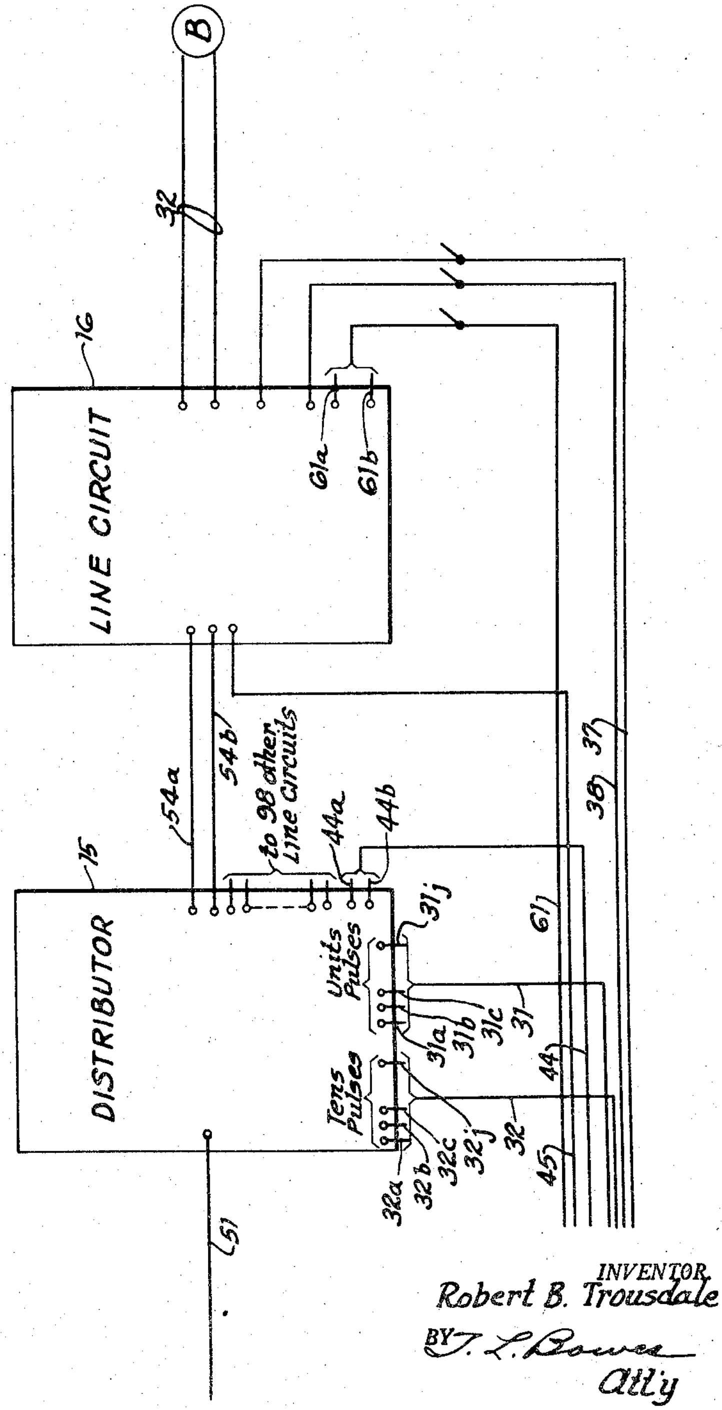

To perform the above-mentioned functions in the manner fully explained below, the connector **12*b*, as diagrammatically illustrated in Fig. 2B, is provided with a calling line in gate circuit 207 which responds to finder gate pulses transmitted to the connector over the conductor 12*d* to repeat signal bearing pulses delivered thereto from the multiplexer 11 in the pulse time position assigned to the calling line, and a calling line reconstructor circuit 208 having the function of detecting or reconstructing and storing the intelligence carried by the signal bearing pulses transmitted to the connector from the multiplexer 11 in the pulse time position assigned to the calling line. The connector 12*b* further comprises a called line out gate circuit 224 for gating to the distributor 15 connector signal pulses carrying the intelligence reconstructed by the circuit 208 in the time position assigned to a particular called line. In addition, the connector 12*b* includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12*d* to gate the distributor 15 signal bearing connector pulses which occur in the pulse time position assigned to the calling line. More generally, the three circuits 207, 208, and 224 function to repeat intelligence from the calling line to the called line, whereas the three corresponding circuits 223, 222, and 226** function to repeat to the calling line intelligence derived from the called line.

The connector **12*b* additionally comprises a plurality of components for responding to two digits of dial pulses repeated to the connector on multiplexer pulses occurring in the pulse time position assigned to the calling line. In general, the dial pulse responsive equipment of the connector 12*b* comprises a dial impulse integrator circuit 209 which receives dial impulses from the reconstructor circuit 208, a tens changeover gate circuit 210, a units start gate circuit 213 to which pulses are repeated by the dial pulse integrator circuit 209, tens and units digit registers 211 and 215 which are respectively controlled in accordance with the numerical values of the tens and units digits repeated to the circuits 210 and 213 from the integrator circuit 209, a units changeover gate circuit 214 interposed between the start gate circuit 213 and the units digit register 215, and tens and units sequence timing circuits 212 and 216 which in effect function as the digit counting components of the connector, i.e., initiate certain operations at the ends of the first and second digits dialed into the connector. The connector further comprises a connector pulse forming circuit 217 which is controlled in accordance with the settings imparted to the tens and units digit registers 211 and 215 at the end of a dialing operation to produce the connector pulses which are employed to control the circuits 222, 223, and 224 in the transmission of intelligence and control signal information from the connector to the distributor 15 in the pulse time position assigned to the called line. The busy test facilities of the connector comprise a busy test circuit 218 jointly controlled by the connector pulse forming circuit 217 and busy pulses transmitted to the connector over the common busy lead 52, a busy lock circuit 219 and a busy gate circuit 220. In addition, the connector comprises supervisory tone gate circuits 225 having the function of gating dial, busy and ring-back tones to the calling line. Finally, the connector comprises a ring trip circuit 221** which is assigned the function of terminating ringing current transmission to a called substation when a call answering operation is performed at the substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network in the manner more fully explained below. As controlled by the phase shifter and pulse former network 19, the units pulse ring circuit 20 functions sequentially to develop the units pulses which define the pulse time positions of the pulse frames, appear on the conductors within the cables 31 and 30, respectively, and are fed by way of these conductors to the various intelligence transmitting and control components of the system. More specifically, the cable 30 comprises ten units pulse conductors **30*a*, 30*b*–30*j* over which negative units pulses are sequentially transmitted in the order named to the units coincidence tube circuits 204 of the finders 12*a*, 13*a*, and 14*a* and the units digits registers 215 of the connectors 12*b*, 13*b*, and 14*b*. In time coincidence with the described negative units pulses, the ring circuit 20 produces positive units pulses on the ten units pulse conductors 31*a*, 31*b*–31*j* forming the cable 31, which are transmitted to the units gate circuits of the distributor 15 and also to the pulse gate circuits of a channel pulse commutator 22. The positive units pulses developed upon the two conductors 31*a* and 31*f* are also employed to control a bias and ringing carrier supply circuit 26 and to energize a portion of an alarm circuit 300. The positive and negative units pulses are sequential developed on the units lead 31 and 30**, respectively, at a frequency rate of 100 kilocycles and each tenth positive units pulse, i.e., each pulse appearing on the units pulse conductor 31*j*, is used to step or trigger a tens pulse ring circuit 21 having the function of developing the positive and negative tens pulses, each of which spans the time interval of ten units pulses. The positive tens pulses as sequentially produced by the ring circuit 21 on the tens pulse conductors 32*a*, 32*b*–32*j* forming the cable 32 are impressed upon the tens pulse gate circuits of the multiplexer 11, the alarm circuit 300, and the tens pulse gate circuits of the distributor 15 in the manner more fully explained below. The negative tens pulses as produced by the ring circuit 21 in time coincidence with the positive tens pulses and as sequentially impressed on the tens pulse conductors 33*a*, 33*b*–33*j* forming the cable 33 are impressed on the tens coincidence tube circuits 203 of the finders 12*a*, 12*b* and 12*c* and the tens digit registers 211 embodied in the connectors 12*b*, 13*b*, and 14*b*, all in the manner more fully explained below. As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b*–34*j* forming the cable 34, which are fed to the units pulse gate circuits of the multiplexer 11 and to the alarm circuit 300. These channel pulses occur at the same frequency as the units pulses, but are much narrower in width. For example, the channel pulses appearing on the conductor 34*a* are much narrower than the units pulses appearing on the positive units pulse lead 31*a* and are preferably so phased relative to the units pulses that each channel pulse occurs well within the limits of the coincident positive units pulse. Commutator drive pulses as derived from the commutator drive circuit 25 are also transmitted over a conductor 301 to the alarm circuit 300 and over a commutator drive pulse conductor 35 to the outgate circuits 224 and 226 of each of the connectors 12*b*, 13*b*, and 14*b*.

The common equipment 17 further comprises a link allotter 24 having the function of developing link allotting pulses of relatively long duration (preferably each pulse persists for at least one millisecond) successively on the link allotting conductors 36*a*, 36*b*, and 36*c*. These conductors individually extend to the pulse combining circuits 202 of the finders 12*a*, 13*a*, and 14*a* and the pulses impressed thereon perform the function of rendering the respective corresponding links available for use providing the links are not already occupied with calls.

As indicated above, the line circuits 10, 16, etc., individually terminating the lines of the system, perform the function of transmitting ringing current to their respective associated substations. Keyed ringing current transmission from any line circuit terminating a called idle line is effected at a predetermined slow rate of the order of one second on and four seconds off, under the control of the bias and ringing carrier supply circuit 26 and a keying circuit 27 which are embodied in the common equipment 17 and are connected to each of the line circuits 10, 16, etc., over common multiple conductors 37 and 38. The common equipment also includes dial tone and busy tone sources which are collectively indicated at 29 in Fig. 4 of the drawings and are respectively connected by way of the multiple conductors 46 and 47 to the supervisory tone gate circuits 225 of each of the connectors 12*b*, 13*b*, and 14*b*. The common equipment further comprises a ring-back tone generator 29*c*, the output signal of which is keyed by the ringing keying circuit 27 and supplied to the supervisory tone gate circuits 225 of each of the connectors 12*b*, 13*b*, and 14*b* over a common multiple conductor 48. Finally, the common equipment includes a ringing supply circuit 60 which embodies a 20 cycle ringing current source and which is connected by way of two common multiple conductors 61*a* and 61*b* within the cable 61 to each of the line circuits of the system.

An auxiliary common equipment 17*a* is provided for each exchange and includes a bias and ringing carrier supply 26*a*, a master oscillator 18*a*, a phase shifter and pulse former 19*a*, a commutator drive circuit 25*a*, a channel pulse commutator 22*a*, a tens pulse ring 21*a*, and a units pulse ring 20*a*, all of which are identical to and connected in multiple with the like identified components in the common equipment 17. The auxiliary common equipment 17*a* is normally energized but is biased into a standby or inoperative state by the alarm circuit 300, which circuit also biases the equipment 17 into a normal operating condition. If any of the pulse sources connected to the alarm circuit 300, such as the commutator drive circuit 25 or the tens pulse ring 21, fail for any reason, the alarm circuit 300 switches the auxiliary common equipment 17*a* over to a normal operating condition and returns the common equipment 17 to a standby condition. This substitution of the auxiliary common equipment 17*a* for the equipment 17 is completed before the pulse failure can control the +B switching circuit 201 in finder 72*a* to release all or any portion of a completed or partially completed connection, thereby preventing the loss of any calls due to any type of pulse failure.

In order to render the mode of operation of the system more readily understandable, a pulse chart has been illustrated in Figs. 13 to 16, inclusive, to show the relative widths of the pulses developed by the common equipment components 19, 25, 20, 21, and 22 during two successive pulse frames, as well as the time or phase relationship between the pulses. As there shown, the units pulse ring drive pulses 95*a*, appearing on the conductor 40 are produced by the phase shifter and pulse former circuit 19 along the zero potential reference line 95 at a frequency rate of one megacycle and are of positive polarity. Similarly, the channel pulse commutator drive pulses 96*a* appearing on the conductors 41 and 35 are produced by the phase shifter and pulse former network 19 along the zero potential reference line 96 at the same frequency of one megacycle and are of positive polarity. It will be noted that both the units pulse ring drive pulses 95*a* and the commutator drive pulses 96*a* are very narrow, i.e., persist for very short time intervals, and that the pulses 96*a* are so displaced in time relative to the pulses 95*a* that each commutator drive pulses 96*a* occurs approximately at the middle of the period separating the preceding and succeeding units pulse ring drive pulses 95*a*. The positive units pulses appearing respectively on the units pulse conductors 31*a*, 31*b*–31*j* and the negative units pulses coincidentally appearing on the units pulse conductors 30*a*, 30*b*–30*j* are produced along the zero potential reference lines 62, 63–71. More specifically, the positive units pulses produced along these potential reference lines and appearing on the units pulse conductors 31 are shown in solid lines, whereas the coincident negative units pulses produced along the same reference lines and appearing on the units pulse conductors 30 are shown in dash lines. It will be noted that the units pulses are produced by the units pulse ring circuit 20 at the fundamental frequency rate of one megacycle. However, due to diversion of the pulses successively to different ones of the units pulse conductors *a*, *b*–*j*, the pulses along any particular zero potential reference line, such, for example, as the line 62, recur only at a frequency rate of one hundred kilocycles. It will also be noted that the units pulses, both positive and negative, are successively produced on the units pulse conductors 30 and 31 in the order of alphabetical designation of these conductors. Thus, successive positive and coincident negative units pulses produced along any particular zero potential reference line, as, for example, those occurring during the units pulse periods 62*a*, 62*b*, 63*c*, etc., along the potential reference line 62, are separated by a time interval equaling the sum of nine units pulse time positions and during which units pulses are produced successively along each of the nine other zero potential reference lines.

The negative tens pulses successively produced by the tens pulse ring circuit 21 on the tens pulse conductors 33a, 33b–33j and the positive tens pulses coincidentally produced on the tens pulse conductors 32a, 32b–32j are illustrated as appearing along the ten zero potential reference lines 72 to 81, inclusive. Here also, the positive tens pulses are shown in solid lines, whereas the coincidentally produced negative tens pulses are shown in dash lines. It will be noted that each tens pulse persists for a time interval exactly equaling the time required to produce ten units pulses. Thus the positive and negative tens pulses 72a persist for the duration of the interval in which the ten units pulses 62a–71a are successively produced by the units pulse ring circuit 20. It will also be noted that the starting point of each tens pulse period 72a, 73a, 74a, etc., is exactly coincident with the starting points of the positive and negative units pulses 62a, 62b, 62c, etc., appearing along the zero potential reference line 62 and impressed upon the units pulse conductors 30a and 21a, respectively, by the units pulse ring circuit 20. Further, each tens pulse period terminates at the exact instant of termination of the positive and negative units pulses 71a, 71b, 71c, etc., appearing along the zero potential reference line 72 and produced by the units pulse ring circuit 20 on the conductors 30j and 31j, respectively. The described synchronism between the time positions of the tens pulses and the time positions of the units pulses successively produced on the units pulse conductors by the ring circuit 20 is obtained and maintained by employing the trailing edges of the positive units pulses appearing on the last positive units pulse conductor 31j to step or trigger the tens pulse ring 21 on a periodic basis.

The channel pulses which are successively produced on the ten channel pulse conductors 34a, 34b–34j by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96a appearing along the zero potential reference line 96. Like the positive and negative units pulses, the channel pulses are produced at the fundamental frequency rate of one megacycle, but due to the action of the commutator 22 in diverting these pulses successively to the conductors 34a, 34b–34j recur only on each of these conductors at a rate of one hundred kilocycles. Thus the channel pulses 82a, 82b, 82c, etc., appearing along the reference line 82 and impressed on the conductor 34a are spaced apart timewise by like intervals each of which exactly equals the sum of ten units pulse time periods. During this spacing interval, nine additional channel pulses are successively produced along the reference lines 83, 84–91 to appear on the conductors 34b, 34c–34j. It will also be noted that the channel pulses are very narrow in width, having a persistence interval of the order of one-fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95a, to open the gating circuits of the channel pulse commutator 22 in the manner more fully explained below. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 13 to 16, inclusive, in mind, it will readily be understood that each pulse frame is divided into one hundred readily identifiable pulse time positions. Thus the first ten pulse time positions of each pulse frame, which are respectively assigned to the lines of the system having the directory number designations 11, 12—10, are defined by the first tens pulse period 72a of the frame within which the ten units pulse periods 62a, 63a, 64a–71a occur. Similarly, the second ten pulse time positions, which are respectively assigned to the lines of the system having the directory number designations 21, 22, 23—20, are defined by the second tens pulse period 73a during which the ten units pulse periods 62b, 63b–71b occur. Again, the third ten pulse time positions, which are respectively assigned to the lines of the system having the directory number designations 31, 32, 33—30, are marked out by the third tens pulse time period 74a during which the ten units pulse periods 62c, 63c, 64c–71c occur. Thus it will be understood that the pulse time position of each pulse frame which is assigned to the illustrated line 23 occurs during the second tens pulse interval 73a of each pulse frame and is coincident with the units pulse period 64b of each pulse frame. It will also be apparent that the corresponding signal pulse 84b occurs well within the limits of this pulse time position. Similarly, the pulse time position 32 assigned to the illustrated line 32 occurs during the third tens pulse time interval 74a of each pulse frame and is coincident with the second units pulse period 63c of each pulse frame. Here again, each channel pulse 83c corresponding to the line 32 occurs well within the limits of the particular pulse time position assigned to the line 32 in each pulse frame.

*Operation of the system as a whole*

Briefly to consider the general mode of operation of the system, it may be assumed that the substation B is called from the substation A during a period when the finder-connector link 12 is idle and is allotted for use under the control of the link allotter 24. When the receiver or hand set at the substation A is lifted from its supporting hook or cradle to initiate the call, a loop circuit including the conductors of the line 23 is closed to the line circuit 10, with the result that this line circuit immediately operates to change the magnitude of the bias potential which it delivers over the conductor 53 to the units gating circuit of the multiplexer 11 which individually corresponds to the line 23. The multiplexer 11 responds to this change in magnitude of the controlling bias potential supplied thereto from the line circuit 10 by opening the units gate corresponding to the line 23 to permit the ten pulses 84a, 84b, 84c, etc., to pass through this gate. The tens gate circuit controlled by the tens pulse 73a corresponding to the ten line subgroup including the line 23 is, however, only opened in coincidence with the signal pulse 84b during each pulse frame. Accordingly, only the signal pulses 84b occurring during the pulse time positions 64b of successive pulse frames, are permitted to pass over the common conductor 50 to the pulse input circuits 200 of the finders 12a, 13a, and 14a and the in gate circuits 207 and 223 of the connectors 12b, 13b, and 14b in parallel. At this point the pulses transmitted from the multiplexer 11 over the common conductor in the pulse time position 64b may be regarded as multiplexer pulses 84b. Since only the link 12 is conditioned by the allotter 24 and the combining circuit 202 of the finder 12a to handle the call, and the connector 12b of this link is as yet inoperative, only the finder 12a initially responds to the multiplexer pulses 84b delivered thereto from the multiplexer 11 over the conductor 50 in the described pulse time position 64b.

In the finder 12a the multiplexer pulses 84b are repeated by the pulse input circuit 200 to effect substantially immediate operation of the +B switching circuit 201 embodied in this finder, whereby operating anode potentials are delivered to the tubes of the circuits 209, 211, 212, 213, 214, 215, 216, 218, 219, 223, 224, and 225 of the connector 12b over the +B switch conductor 12c, with the result that the connector 12b is conditioned for operation, i.e., conditioned to respond to signal carrying multiplexer pulses delivered thereto from the multiplexer 11 over the conductor 50. Operation of the +B switching circuit in the finder 12a also has the effect of conditioning the tens and units coincidence tube circuits 203 and 204 of this finder for operation under the joint control of the multiplexer pulses 84b repeated by the input circuit 200, the negative units pulses developed by the units pulse ring circuit 20. In responding to the tens and units pulses impressed thereon coincidentally with the multiplexer pulses 84b, the tens and units coincidence tube circuits 203 and 204 of the finder 12a cooperate with the finder pulse forming circuit 205 and the combining circuit 202 of this finder to produce finder gating pulses which are transmitted over the conductor 12d to the circuits 207, 208, and 226 of the connector 12b and have the effect of initially limiting the response of the connector only to multiplexer pulses 84b appearing in the pulse time position 64b. The combining circuit 202 of the finder 12a also gates busy pulses in the pulse time position 64b which are fed over the common busy lead 52 to each of the other finders and connectors of the system to prevent these finders from responding to multiplexer pulses occurring in this time position. Thus the line 23 is guarded against intrusion on an incoming call. In addition, the pulses gated by the circuit 202 to the conductor 12d are impressed upon the pulse input circuit 200, thereby to render the finder 12a responsive only to multiplexer pulses 84b appearing in the pulse time position 64b. Finally, the busy pulses developed in the time position 64b render the finder 12a non-responsive to link allotter pulses impressed upon the allotter conductor 36a, individual to the link 12, by the allotter 24. After the finder 12a has operated to perform the described functions, continued holding of the finder 12a is dependent upon continued acceptance and transmission of multiplexer pulses 84b by the pulse input circuit 200, which of course means that the finder will remain associated with the calling line 23 only so long as a calling condition persists on this line.

As indicated above, when the +B switching circuit 201 of the finder 12a operates to apply operating anode potential to the conductor 12c, the circuits 209, 211, 212, 213, 214, 215, 216, 218, 219, 223, 224, and 225 of the connector 12b are conditioned for operation. Immediately anode potential is applied to the dial tone gating tube of the network 225, this network functions to transmit a dial tone signal, derived from the dial tone generator 29b over the conductor 47, to the calling line out gate circuit 226 over the conductor 244. This circuit in responding to the dial tone signal and also to the finder gate pulses delivered thereto over the conductor 12d and the commutator drive pulses 96a delivered thereto over the conductor 35, functions to repeat over the channel conductor 51 to the distributor 15 connector signal pulses modulated in accordance with the dial tone signal in the pulse time position 64b assigned to the calling line. The distributor 15 responds to the connector signal pulses thus transmitted thereto by repeating the same through the tens and units gate circuits thereof over the conductor 44a to the line circuit 10. In the line circuit 10, the dial tone signal is detected and transmitted over the line 23 to signal the calling subscriber that the dialing operation may be initiated.

Two digits of dial impulses must be dialed into the connector 12b in order to effect selection in the connector of the pulse time position 63c assigned to the called line 32. More specifically, the directory number digits 3 and 2 must be dialed successively into the connector 12b to effect selection of the pulse time position 63c. During the open circuit period of each dial impulse, the control bias supplied by the line circuit 10 to that units gate circuit of the multiplexer 11 which corresponds to the calling line 23 is returned to its on-hook value to interrupt the transmission of multiplexer pulses 84b over the conductor 50 to the pulse input circuit 200 of the finder 12a and to the in gate circuits 223 and 207 of the connector 12b. At this point, it is noted that the +B switching circuit has a fundamentally new time delay feature incorporated therein which prevents this circuit from removing operating anode potential from the conductor 12c during the open circuit periods of dial impulses, hook switch flashing and the like. Thus premature release of the link 12 during dialing is positively prevented through the action of the +B switching circuit 201 to maintain operating anode potential upon the conductor 12c during the open circuit period of each dial impulse. With the +B switching circuit 201 operating to supply anode potentials to the tubes of the coincidence tube circuits 203 and 204 of the finder 12a, finder gating pulses continue to be transmitted over the conductor 12d to the circuits 207, 208, and 226 of the connector 12b. Thus these circuits are held in condition to respond to intelligence and control signals delivered thereto from the multiplexer 11 on multiplexer pulses 84b impressed upon the conductor 50 in the pulse time position 64b.

During the make period of each impulse dialed at the calling substation multiplexer signal pulse transmission from the multiplexer 11 to the finder 12a and the connector 12b in the pulse time position 64b is resumed. As controlled by the finder gating pulses delivered to the circuits 207 and 208 from the circuit 202 over the conductor 12d, the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 209 develops coincident impulses which are impressed upon the tens changeover gate circuit 210 and the units start gate circuit 213 over the conductors 227 and 228, respectively. Pending operation of the tens sequence timing circuit 212, the units start gate circuit 213 is held non-responsive to the three impulses transmitted thereto by the dial impulse integrator circuit 209 during dialing of the first digit 3 at the calling substation. However, the tens changeover gate circuit functions to repeat the three impulses over the conductors 230 and 231, respectively, to the tens digit register circuit 211 and the tens sequence timing circuit 212. In responding to the three impulses thus transmitted thereto, the tens digit register 211 is driven to a setting wherein tens pulses appearing on the negative tens pulse conductor 33c in the third tens pulse time position 74a of each pulse frame may be transmitted through the third tens gate of this register and over conductor 232, to the connector pulse forming circuit 217. Transmission of the three impulses individually corresponding to the three break periods of the first digit dialed at the calling substation over the conductor 231 to the tens sequence timing circuit 212 has the effect of conditioning this circuit to block the tens changeover gate circuit from repeating impulses to the tens digit register 211 during dialing of the second digit and to render the units start gate circuit 213 operative to repeat the pulses delivered thereto by the dial impulse integrator circuit 209 during dialing of the second digit at the calling substation. Immediately the first dial impulse is repeated to the tens digit register 211 to drive this register off normal, a control potential is developed on the conductor 233 which biases the dial tone gate tube of the network 225 beyond cutoff, such that dial tone transmission through this gate tube to the calling line out gate circuit 226 over the conductor 244 is terminated. Thus, transmission of the dial tone signal to the calling substation A is arrested.

During the interdigit pause which separates dialing of the first and second digits at the calling substation, the tens sequence timing circuit 212 assumes a stable operating condition wherein a controlling potential is impressed upon the conductor 234 to bias the tens changeover gate circuit 210 against repeating further impulses transmitted thereto from the dial impulse integrator circuit 209. In assuming this condition, the tens sequence timing circuit 212 also changes the potential level on the conductor 235 to render the units start gate circuit operative to repeat impulses delivered thereto from the dial impulse integrator circuit 209 to the units changeover gate circuit 214 over the conductor 238.

During dialing of the second digit 2 at the calling substation A, the dial impulse integrator circuit 209 responds by transmitting two impulses to each of the gate circuits 210 and 213. As noted above, however, the changeover gate circuit 210 is now blocked against repeating these impulses. The units start gate circuit 213 repeats the two impulses to the units changeover gate circuit 214 over the conductor 238 and the latter circuit repeats the impulses over the conductors 236 and 237, respectively, to the units digit register 215 and the units sequence timing circuit 216. As a consequence, the units digit register is operated or driven to open the second units gate circuit therein, thereby to establish a path for the transmission of units pulses appearing in the time positions **63*a*, 63*b*, 63*c*, etc., to the connector pulse former circuit 217. The two pulses repeated to the units sequence timing circuit 216 over the conductor 237** serve to condition this circuit for operation at the end of the second digit.

At the end of the second digit dialed into the connector **12*b*, the units sequence timing circuit 216 operates to change the potential level on the conductor 241 to a value such that the units changeover gate circuit 214 is blocked against further pulse transmission therethrough. Concurrently, a potential is applied to the conductor 242 in the units sequence timing circuit 216 which has the effect of rendering the busy test circuit 218 operative to determine the idle or busy condition of the called line by testing the pulse time position 63*c*** assigned to this line.

The potential applied to the conductor 242 also has the effect of rendering the connector pulse former circuit 217 operative to mix the tens and units pulses respectively transmitted thereto from the registers 211 and 215 over the conductors 232 and 245 to produce a resultant connector pulse which appears on the conductor 239. More specifically, the tens pulses **74*a* appearing on the negative tens pulse conductor 33*c* and gated by the tens digit register 211 are transmitted to the connector pulse former circuit 217 over the conductor 232 where they are mixed with the negative units pulses appearing in the time position 63*c* which are gated by the units register 215 and transmitted to the circuit 217 over the conductor 245. Mixing of these pulses in the circuit 217 results in the production of a resultant connector pulse which occurs during each pulse frame in the pulse time position 63*c* assigned to the called line. These pulses are transmitted over the conductor 239 to the connector components 218, 220, 222, 223, and 224**.

Effectively, the busy test circuit 218 and the busy lock circuit 219 cooperate to perform the busy test operation in the connector **12*b*. More specifically, if the called line 32 is busy, i.e., occupied with a call, busy pulses are present on the common busy conductor 52 in the pulse time position 63*c* assigned to the called line. The manner in which such busy pulses are applied to the conductor 52 in another link occupied with the call involving the line 32 will be apparent from the foregoing explanation. These busy pulses are impressed upon the busy test circuit 218 coincidentally with the connector pulses developed by the connector pulse forming circuit 217 and impressed upon the busy test circuit 218 over the conductor 239**. Coincidence between the connector pulses and the busy pulses has the effect of preventing the busy test circuit from operating. Thus the busy condition of the called line is indicated.

In the event the called line is busy, the busy lock circuit 219 as controlled over the conductors 242 and 246 and through the resistor 247 from the units sequence timing circuit 216 measures a predetermined time interval, i.e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone source by way of the conductor 46, the busy gate circuit in the network 225, the calling line out gate circuit 226, the channel conductor 51, the distributor 15 and the line circuit 10 to the calling line. Thus the calling subscriber is advised of the busy condition of the called line.

Assuming that the called line 32 is idle at the time the pulse time position **63*c* assigned thereto is selected in the connector in the manner explained above, such busy pulses as may be present on the common busy lead 52 do not occur coincidentally with the connector pulses generated by the connector pulse forming circuit 217 in the pulse time position 63*c* assigned to the called line. When coincidence between the connector pulses and the busy pulses is lacking, the busy test circuit operates immediately in accordance with the first connector pulse impressed thereon from the connector pulse forming circuit 217 over the conductor 239. In operating, the circuit 218 applies a positive potential upon the cut-through conductor 251 which is transmitted to the busy lock circuit 219 to prevent the latter circuit from operating at the end of the busy test interval. The positive potential applied to the cut-through conductor 251 in the busy test circuit 218 when this circuit operates is also applied to the called line out gate circuit 224 to condition the latter circuit to repeat connector signal pulses in the time position 63*c* to the distributor 15, and is applied to the busy gate circuit 220 so that connector pulses are released to the busy conductor 52 and is also applied to the network 225 to act as an operating anode potential for the ring-back tone gate tube of this network. The positive potential developed on the cut-through conductor 251 is also applied to the called line in gate circuit 223 and the called line reconstructor circuit 222, thereby to condition these circuits to accept signals derived from the called line. This feature of making operation of the circuits 223 and 222** dependent upon operation of the busy test circuit to indicate that the called line is idle, is necessary in order to prevent the calling subscriber from listening in on a conversation being held over the called line when the called line is busy.

The positive potential applied to the cut-through conductor 251 is also impressed upon the ring trip circuit 221 and is applied through certain components of this circuit to the ring trip conductor 253 which extends to both the called line out gate circuit 224 and to the ring-back tone gate circuit of the network 225. When this occurs, the ring-back tone gate circuit of the network 225 is rendered operative to transmit the intermittent ring-back tone signal derived from the keying circuit 27 over the conductor 48 to the calling line out gate circuit 226 over the conductor 244. The ring-back tone signal is modulated on the signal pulses developed by the out gate circuit 226 and thus transmitted by way of the conductor 51 and the distributor 15 to the line circuit 10. In the line circuit 10, the ring-back tone signal is detected and transmitted over the calling line 23 to the calling substation. Thus the calling subscriber is signaled that the called substation is being rung.

When the called line out gate circuit 224 is conditioned for operation through application of the described positive potential to the cut-through conductor 251, it responds to the connector pulses impressed upon the connector pulse conductor 239 by connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the pulse time position 63*c* assigned to the called line, whereby very narrow connector signal pulses are released over the conductor 51 to the distributor 15 which are well within the limits of the pulse time position 63*c* assigned to the called line. So long as the positive potential applied to the cut-through conductor 251 in the busy test circuit 218 is fed through the ring trip circuit 221 to the ring trip conductor 253, the called line out gate circuit 224 is controlled to release connector signal pulses to the distributor 15 in the pulse time position 63*c* which are approximately fifty percent larger in amplitude than those used to convey intelligence signals to the distributor 15 after the call is answered at the called substation B. These large amplitude signal pulses are diverted by the distributor 15 to the line circuit 16 and serve to signal this line circuit that the ringing operation should start.

More specifically, the large amplitude connector signal pulses are released by the distributor 15 to the line circuit 16 over the conductor 54*a*. In this line circuit, these pulses have the effect of activating the ringing control facilities of the line circuit 16 with the result that ringing current keyed at a slow rate of approximately one second on and four seconds off is transmitted over the line 32 to energize the ringer provided at the called substation B. Ringing of the called substation persists until the call is answered or until the call is abandoned at the calling substation A. Assuming that the call is answered, the line circuit 16 functions to change the magnitude of the control potential supplied over the conductor 45 to the multiplexer 11 with the result that the gate assigned to the called line 32 in the multiplexer 11 is opened to permit multiplexer pulses 83*c* occurring in the pulse time position 63*c* of each pulse frame to be transmitted through the corresponding tens and units gate circuits of the multiplexer 11 and over the conductor 50 to the multiplexer input terminals of each of the finders and connectors of the system.

The multiplexer pulses 83*c* are impressed upon the calling and called line in gate circuits 207 and 223 in the connector 12*b*. In the calling line in gate circuit 207, the repeated multiplexer pulses 83*c* are not in coincidence with the finder gate pulses impressed upon the circuit 207 over the conductor 12*d* and hence are not repeated to the reconstructor circuit 208. However, in the called line in gate circuit 223 the multiplexer pulses 83*c* occur in time coincidence with the connector pulses impressed upon the circuit 223 over the connector pulse conductor 239 from the connector pulse former circuit 217. As a consequence, the call answering signal carried thereby is gated to the reconstructor circuit 222 where it is detected to produce a potential on the conductor 252 which has the effect of tripping the ring trip circuit 221. In operating, the ring trip circuit 221 functions substantially to decrease the positive potential on the ring trip conductor 253. The called line out gate circuit 224 responds to this reduction in potential on the conductor 253 by decreasing by approximately fifty percent the amplitude of the connector signal pulses transmitted over the conductor 51 and through the distributor 15 to the line circuit 16. The ringing control facilities of the line circuit 16 respond to this decrease in the amplitude of the connector signal pulses delivered thereto by terminating the transmission of ringing current to the called substation. Thus the ringing operation is arrested. The decrease in the positive potential present on the ring trip conductor 253 which occurs when the ring trip circuit 221 operates also has the effect of closing the ring-back tone signal transmission gate of the network 225, with the result that transmission of the ring-back tone signal to the calling substation is arrested.

Following the described operations in the connector 12*b*, a two-way talking or communication circuit is fully established between the calling substation A and the called substation B. Thus, voice or other signals developed at the substation A and transmitted over the line 23 to the line circuit 10 serve to vary the bias voltage impressed upon the gate circuit of the multiplexer 11 over the conductor 53 directly in accordance with the instantaneous amplitude of such signals. As a consequence, the multiplexer pulses 84*b* released by the multiplexer 11 over the conductor 50 to the finders and connectors of the system in the pulse time position 64*b* are modulated in accordance with the voice or other signals developed at the calling substation A. These signal modulated multiplexer pulses cannot be accepted by any finder of the system other than the finder 12*a* or any connector of the system other than the connector 12*b* because of the busy pulses fed to the busy conductor 52 from the circuit 205. In the finder 12*a*, the multiplexer pulses 84*b* maintain the +B switching circuit 201 operated to hold the link 12 associated with the line 23. The signal modulated multiplexer pulses 84*b* are also transmitted through the calling line in gate circuit 207 and over the conductor 255 to the calling line reconstructor circuit 208 where they occur in time coincidence with the finder gating pulses impressed upon the reconstructor circuit over the conductor 12*d* in pulse time position 64*b*. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the out gate circuit 224 in the pulse time position 63*c* assigned to the called line. These modulated signal pulses are transmitted to the distributor 15 over the conductor 51 and released by the distributor 15 to the line circuit 16. In the line circuit 16, the signal components of the connector signal pulses are detected and transmitted over the line 32 to the called substation B where they are audibly reproduced by the receiver of the telephone instrument provided at the called substation.

Voice signals developed at the called substation B and transmitted over the line 32 to the line circuit 16 cause the bias potential delivered over the conductor 45 to the gate circuit of the multiplexer 11 which corresponds to the called line 32 to vary in exact accordance therewith. As a consequence, the voice signals are modulated upon the multiplexer pulses 83*c* occurring within the pulse time position 63*c* and released through the units and tens gates of the multiplexer and over the conductor 50 to the finders and connectors of the system. These signal modulated multiplexer pulses cannot be accepted by any finder of the system for the reason that the finder 12*a* is synchronized to accept only multiplexer pulses 84*b* occurring in the time position 64*b* and the busy pulses fed to the busy conductor 52 in the time position 64*b* assigned to the called line by the busy gate circuit 220 of the connector 12*b* prevent the other finders from accepting or responding to the described signal modulated multiplexer pulses 83*c*. In the connector 12*b*, the signal modulated multiplexer pulses 83*c* are impressed upon the calling and called line in gate circuits 207 and 223 and are repeated by the circuits 223 over the conductor 254 to the called line reconstructor circuit 222. Due to lack of coincidence between the signal bearing multiplexer pulses 83*c* and the finder gating pulses impressed upon the calling line in gate circuit 207 over the conductor 12*d*, the circuit 207 does not gate these pulses to the reconstructor circuit 208. By virtue of the coincidence between the signal bearing multiplexer pulses 83*c* and the connector pulses appearing coincidentally on the conductor 239, both of which are impressed upon the called line reconstructor circuit 222, this circuit detects or reconstructs and stores the voice signal components carried by the multiplexer pulses 83c. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12d. The voice signal modulated pulses developed in the calling line out gate circuit 226 are released by the distributor 15 in the pulse time position 64b and are diverted to the line circuit 10 through the gating circuit of the distributor which corresponds to the calling line. In the line circuit 10, the signal components of the pulses released by the calling line out gate circuit 226 are detected and transmitted over the line 23 to the calling substation A where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation. This non-interfering feature of the system primarily results from the assignment of two discrete and non-interfering pulse time positions in each pulse frame for the transmission of voice or intelligence modulated signals simultaneously through the switching equipment of the system in both directions. Secondarily, it results from physical separation of the intelligence gating circuits in the connector 12b into six discrete components. Thus the calling line in gate circuit 207, the calling line reconstructor circuit 208 and the called line out gate circuit 224 are used only to repeat intelligence or voice signals from the calling line to the called line, whereas the called line in gate circuit 223, the called line reconstructor circuit 222 and the calling line out gate circuit 226 are used only to repeat intelligence or voice signals from the called line to the calling line.

In describing the manner in which the system components 10, 11, 12a, 12b, 15, and 16 are partially or wholly released upon termination of the call, it may be assumed first that the called party at the substation B is the first to hang up. In such case, the bias potential delivered from the line circuit 16 over the conductor 45 to the gating circuit of the multiplexer 11 individually assigned to the called line 32 is restored to its normal value when the called line loop circuit is opened, with the result that multiplexer pulses 83c appearing in the pulse time position 63c are no longer transmitted over the conductor 50 to the finders and connectors of the system. Such termination of multiplexer pulse transmission in the time position 63c to the finders and connectors of the system has no effect other than inactivation of the connector components 223 and 222 and the removal of modulation components from the connector signal pulses transmitted by way of circuit 226 and the distributor 15 to the line circuit 10. In other words, busy pulses in the time position 63c assigned to the called line continue to be fed to the busy conductor 52 from the busy gate circuit 220 of the connector 12b, thereby to prevent the called line 32 from originating a call or accepting an incoming call. This of course means that if the called subscriber picks up his receiver or hand set before the connection is released at the calling substation A, conversation may be resumed between the calling and called subscribers.

When the calling subscriber disconnects by replacing the receiver or hand set at the substation A on its supporting hook or cradle, the loop circuit extending by way of the line 23 to the line circuit 10 is opened, with the result that the bias potential applied over the conductor 53 to that gate circuit of the multiplexer 11 which individually corresponds to the calling line 23 is restored to its normal value. As a consequence, this gate circuit is biased to terminate the transmission of multiplexer pulses 84b occurring in the pulse time position 64b over the conductor 50 to the various finders and connectors of the system. When the transmission of multiplexer pulses 84b to the pulse input circuit 200 of the finder 12a is thus terminated, this circuit is rendered inactive to repeat pulses to the finder circuits 201, 203, and 204. After a predetermined time interval, measured by the overall time constant of the +B switching circuit 201, this circuit responds to cessation of multiplexer pulse transmission thereto by removing the operating anode potential from the conductor 12c. As a consequence, the tens and units coincidence tube circuits 203 and 204 of the finder 12a are restored to normal to interrupt the production of finder gate and busy pulses in the pulse time position 64b by the finder pulse forming circuit 205. Thus, the application of pulses to the combining circuit 202 and hence to the busy conductor 52 in the pulse time position 64b assigned to the calling line 23 is arrested. Termination of pulse transmission to the combining circuit 202 in the time position 64b has the effect of rendering this circuit operative under the control of the link allotter 24 to reassociate the link 12 with another calling line to handle another call. Cessation of busy pulse transmission to the conductor 52 in the pulse time position 64b has the effect of marking the calling line 23 as idle to permit initiation of a second call on this line or seizure of the line on a call incoming thereto.

Removal of operating anode potential from the conductor 12c also has the effect of restoring the component circuits 209, 211, 212, 213, 214, 215, 216, 218, 219, 223, 224, and 225 of the connector 12b to normal, thereby to condition the connector 12b to handle another call. Incident to normalizing of the connector pulse forming circuit 217, connector pulse production on the conductor 239 in the pulse time position 63c assigned to the called line 32 is terminated to arrest the application of busy pulses to the common busy conductor 52 by the busy gate circuit 220 in this pulse time position. Thus the called line is unguarded to free the same for use in initiating another call or accepting a call incoming thereto. It will be noted that normalizing of the identified circuits of the connector 12b has the effect of restoring all components of this connector to the condition which prevailed at the time the link 12 was taken into use to handle the call just described.

As will be evident from the immediately preceding explanation, the key component involved in effecting release of the link 12 is the +B switching circuit 201 embodied in the finder 12a. So long as multiplexer pulses are repeated to this circuit by the pulse input circuit 200 in the time position assigned to the calling line, the circuit positively prevents release of the link 12 and holds both the calling and called lines out of service, i.e., prevents use of the same in initiating outgoing calls or accepting incoming calls. However, when multiplexer pulse transmission by way of the pulse input circuit 200 to the +B switching circuit 201 is arrested for a period of time greater than approximately one-fourth of a second, this switching circuit immediately effects release of the link regardless of the extent of progress of the call and regardless of whether or not the connection has been released at the called substation. Thus, normalizing of the +B switching circuit 201 will effect release of the link 12 upon abandonment of the call which the link is assigned to handle at any point in the process of setting up the desired connection, as for example, call abandonment before dialing is started, call abandonment after dialing is partially completed or call abandonment after dialing is completed and before the call is answered at the called substation. It will also be apparent that if the calling subscriber is the first to release the connection, i.e., hang up, the link 12 is immediately released under the control of the +B switching circuit 201 embodied in the finder 12a. In such case, the line circuit 16 associated with the called line 32 immediately assumes a setting indicating that the line 32 is calling, with the result that a link is assigned to the called line under the control of the allotter 24 and the usual dial tone signal is returned to the called subscriber. This signal has the effect of indicating to the called subscriber that the connection has been released at the calling substation and that he should hang up.

In the event that the transmission of multiplexer pulses through the pulse input circuit 200 is inadvertently terminated by the failure of the pulse generating components 18, 19, 25, and 22, or if the units pulse ring 20, the tens pulse ring 21, or the bias and ringing carrier supply 26 should fail either during or following the completion of a connection, the connection including one of the links 12, 13, or 14 would be released following the one-quarter second time delay provided by the related +B switching circuit similar to the circuit 201. To prevent the loss of these established or partially established connections, the alarm circuit 300 detects the loss of one of the necessary operating pulses and immediately raises the bias on the auxiliary common equipment 17a so that this equipment, which is continually energized but whose output is normally blocked off, is rendered effective to supply the necessary pulses for maintaining the operation of the system.

In this connection, it will be recalled from the above general description of the system that the coincidence tube circuits 203 and 204 in the finder 12a and the tens and units digit registers 211 and 215 in the connector 12b are all energized by the +B switch potential developed on the conductor 12c. Accordingly, the settings of the tens and units coincidence tube circuits 203 and 204, which identify the time position assigned to the calling line, and the settings of the tens and units digit registers 211 and 215, which identify the time position assigned to the called line, are not changed or destroyed for a period of approximately one-quarter of a second after multiplexer pulse transmission through the input circuit 200 to the +B switching circuit 201 ceases. If, during this one-quarter second interval, multiplexer pulse transmission to the +B switching circuit 201 is resumed, the circuit 201 operates to maintain the +B switch potential on the conductor 12c so that the settings of the circuits 203, 204, 211, and 215 controlled thereby are not lost. As a result, the telephonic connection between the calling and called lines is not broken if multiplexer pulse transmission is resumed, as by substituting an auxiliary pulse generating means, before the end of the time delay interval established by the +B switching circuit 201.

Simultaneously with rendering the equipment 17a effective, the alarm circuit 300 returns the pulse generating portions of the equipment 17 to a standby condition and energizes a major alarm of either an audible or a visible type to indicate the need for adjustment of the equipment 17. The alarm circuit 300 may be manually reset to return the equipment 17 to normal operation and to restore the equipment 17a to a standby condition following repair or replacement of the faulty components. The alarm circuit 300 is effective to complete the connection of the auxiliary equipment 17a to the system within the one-quarter second interval provided by the +B switching circuit 201, and, since the auxiliary equipment is continuously energized, the circuit 300 prevents the loss of established or partially established calls due to any type of pulse failure.

The general operation of the automatic telephone system being described hereinabove, reference is made to the copending application of Frank A. Morris and Robert B. Trousdale, referred to above, for a more complete description of the details of this system. Since the alarm system 300 embodying the present invention partially is controlled by and controls the units pulse ring 20, the tens pulse ring 21 and the channel pulse commutator 22, a description of these component circuits is set forth hereinafter in conjunction with the description of the operation of the alarm circuit 300.

*Ring circuits 20 and 21*

Figure 6:
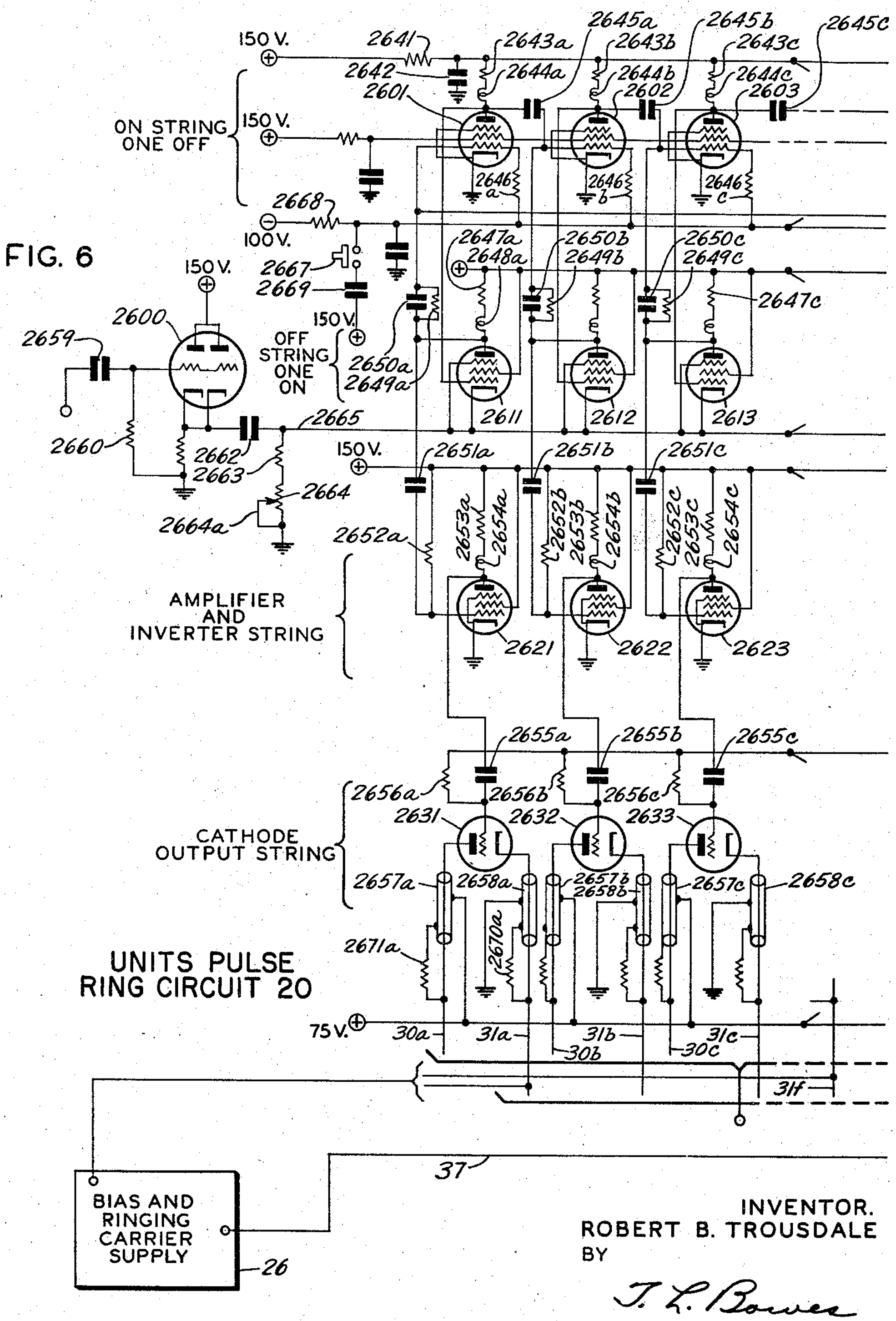
Figure 7:
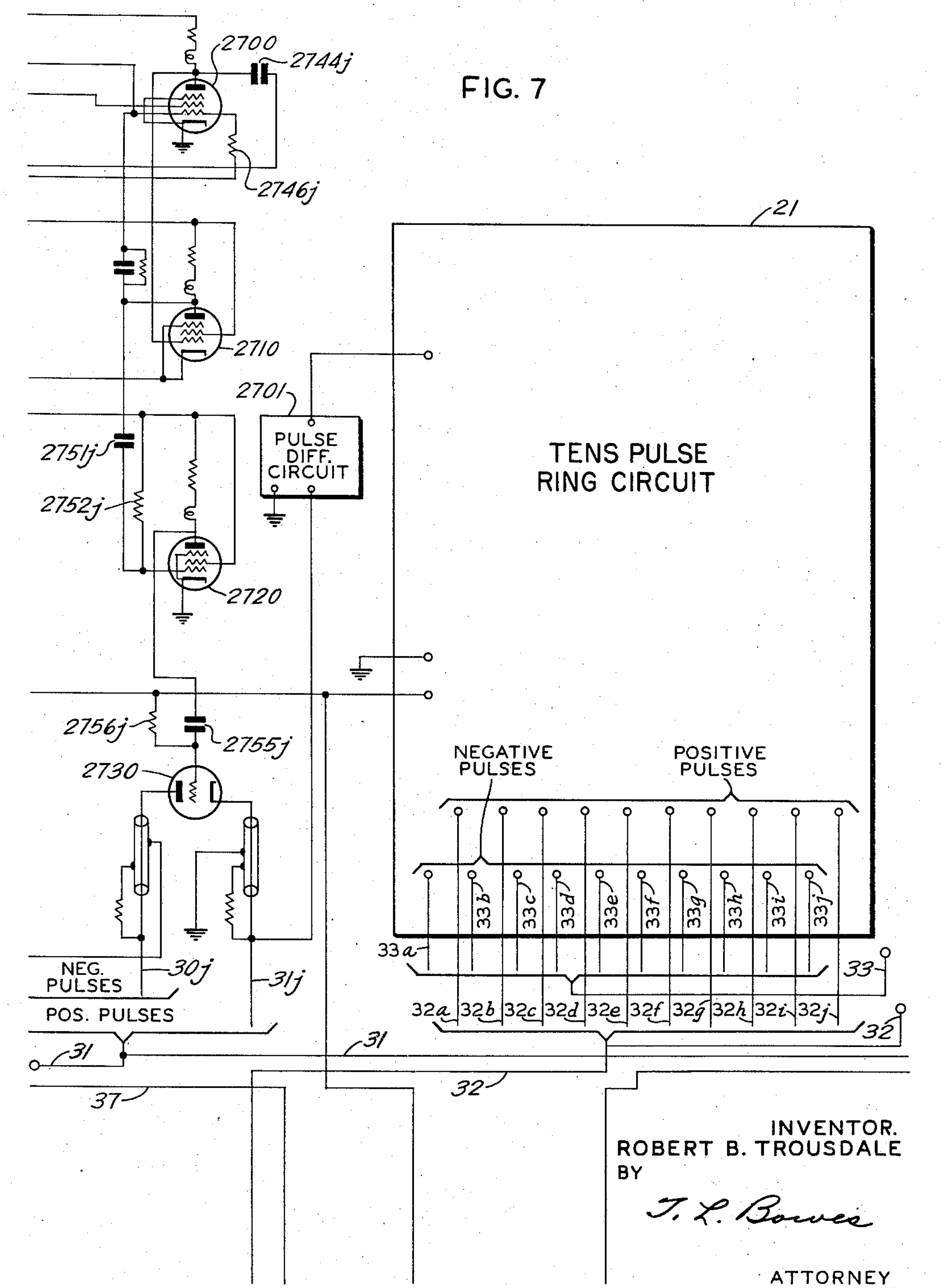

As previously pointed out in the general description of the system, the units pulse ring circuit 20 and the tens pulse ring circuit 21 are identical in circuit arrangement. Accordingly, only the details of the units pulse ring circuit 20 have been illustrated in Figs. 6 and 7 of the drawings. The purpose of the units pulse ring circuit 20, it will be recalled, is that of converting the ring drive pulses 95a developed on the ring drive pulse conductor 40 by the circuit 19 into positive and negative units pulses of a finite and greater width than the channel pulses 96a and of diverting or commutating the negative units pulses thus developed successively to the negative units pulse conductors 30a, 30b–30j, and the positive units pulses successively to the positive units pulse conductors 31a, 31b–31j. In general, the units pulse ring circuit 20 comprises an impulse repeating and amplifying tube 2600 of the 6J6 type connected to operate as a cathode follower in repeating the drive pulses to the ring drive conductor 2665, and ten units pulse forming and gating stages of which the first three and tenth stages are illustrated. Each units pulse gating and forming stage of the circuit 20 comprises four tubes which for convenience of explanation have been arranged in vertical alignment in Figs. 6 and 7 of the drawings. Thus the first pulse forming and gating stage comprises the vertically aligned tubes 2601, 2611, 2621, and 2631, the second stage comprises the four vertically aligned tubes 2602, 2612, 2622, and 2632, the third stage comprises the four vertically aligned tubes 2603, 2613, 2623, and 2633 and the last or tenth stage comprises the four vertically aligned tubes 2700, 2710, 2720, and 2730. Considered on the basis of horizontal alignment, the tubes 2601, 2602, 2603, 2700, 2611, 2612, 2613, and 2710 in the two upper rows are ring circuit tubes, the tubes 2621, 2622, 2623, and 2720 in the third row function as amplifier and inverter tubes and the tubes 2631, 2632, 2633, and 2730 function as output tubes. All tubes in the circuit 20 with the exception of the input pulse amplifying and repeating tube 2600 and the output tubes 2631, 2632, 2633–2730 are commercial type 6AK6 pentodes. The output tubes 2631, 2632, 2633, and 2730 are commercial type 6AS7 triodes.

More specifically considered, the two top tubes of each units pulse forming and gating stage are connected in the manner more fully explained below to function as an Eccles-Jordan flip-flop circuit, such that the ten pairs of tubes in the two upper horizontal tube rows effectively comprise a pulse commutating ring circuit. The successive responses of the ten Eccles-Jordan circuits to successive drive pulses developed on the ring drive conductor 2665 result in the production of pulses at successive stages of the ring circuit which are respectively repeated through the coupling condensers 2651a, 2651b, 2651c–2751j, to the control grids of the amplifier and inverter tubes 2621, 2622, 2623–2720. These tubes in amplifying and inverting the pulses successively received on the control grids thereof repeat the same in amplified form through the condensers 2655a, 2655b, 2655c–2755j, successively to the control grids of the output tubes 2631, 2632, 2633–2730. In responding to the pulses successively impressed upon the control grids thereof, the identified output tubes develop negative units pulses successively on the units pulse conductors 30a, 30b, 30c–30j and simultaneously develop positive units pulses successively on the positive units pulse conductors 31a, 31b, 31c–31j in the manner generally explained above.

In considering the operation of the units pulse ring circuit 20, it is pointed out that the positive drive pulses developed on the ring drive conductor 40 by the phase shift and pulse forming circuit 19 are positively repeated by the tube 2600 through the coupling condenser 2662 to the ring drive conductor 2665. Specifically, each pulse appearing on the conductor 40 produces a voltage drop across the resistor 2660 which drives the parallel connected grids of the tube 2600 positive to produce a corresponding increase in the voltage across the cathode load resistor 2661 of this tube. Each time a positive pulse is thus produced across the resistor 2661 current flows through the condenser 2662 and the series connected resistors 2663 and 2664 to increase the positive potential on the ring drive conductor 2665. Thus the positive input or drive pulses to the units pulse ring circuit 20 are amplified through the tube 2600 and repeated to the ring drive conductor 2665. The two condensers 2659 and 2662 are of such size as to fully discharge during each period separating successive pulses on the conductor 40. Thus the condenser 2659 is provided with a discharge path which includes the resistors 2660 and **3413*b*. Similarly, the condenser 2662 is provided with a discharge path which includes the resistors 2661, 2663, and 2664**.

In order to start the circuit, the switch 2667 is closed to bridge the voltage dropping resistor 2668 and the condenser 2669 in series across the terminals of the negative one hundred volt bias potential source and the positive one hundred and fifty volt anode current source in series. This operation has the effect of producing a heavy current flow through the series connected elements to produce voltage drops thereacross. Initially the major portion of the available two hundred and fifty volts supplied by the two sources appears across the resistor 2668. However, as the condenser 2669 charges up, the voltage drop across the resistor 2668 is decreased to its normal value. The transient voltage which is thus developed across the resistor 2668 has the effect of shock exciting one stage of the ring circuit into operation. After operation of the ring circuit is initiated, the switch 2667 may be opened and the circuit will continue to operate in the manner explained below. It has been found that the described method of starting the ring circuit positively precludes the possibility of two or more stages of the circuit starting to operate simultaneously. Hence the described starting arrangement constitutes an important novel feature of the ring circuit 20.

With the ring circuit in operation, only one of the tubes 2601, 2602, 2603–2700 in the upper horizontal string is off, i.e., non-conducting and only a corresponding one of the tubes 2611, 2612, 2613–2710 in the second horizontal string is on, i.e., conducting at any given instant. Assume now that in the upper horizontal tube string, the tube 2601 is not conducting with all other tubes of this string conducting and that in the second horizontal string the tube 2611 is conducting with all other tubes of this string not conducting. With the circuit in this condition, anode current is delivered to the nine on string tubes 2602, 2603–2700 through the resistors **2643*b*, 2643*c*, etc., and the inductance elements 2644*b*, 2644*c*, etc., and the common voltage dropping resistor 2641 from the anode current source which has a terminal voltage of one hundred and fifty volts. These impedance elements are so proportioned that the voltage drop across the resistor 2641 is approximately 75 volts, which means that the anode potential on the non-conducting tube 2601 is 75 volts and the anode potentials of the other tubes of the on-string are appreciably less than 75 volts. The control grid of the off-string tube 2611 is connected directly to the anode of the on-string tube 2601, such that when the tube 2601 is not conducting the control grid of the tube 2611 has a positive potential of 75 volts reverse impressed thereon relative to ground. However, with the off-string tube 2611 conducting, the current treversing this tube and the resistors 2663 and 2664 causes a voltage drop to be produced across the two identified series connected resistors which has a magnitude of approximately 75 volts. Thus the cathode of the tube 2611 is operating at a positive potential which is substantially the same as the control grid potential of this tube. The bias voltage on the control grid of the tube 2601 is obviously a function of the voltage drop across the resistor 2646*a*, which in turn is a function of the magnitude of current flow through the tube 2611 and the series connected resistors 2647 and 2649. More specifically, with the tube 2611 conducting, the voltage drop across the resistor 2646*a* is relatively low, i.e., of the order of 80 volts, such that the control grid of the tube 2601** is negatively biased to a potential of approximately 20 volts with respect to the tube cathode and the tube is thus biased beyond cutoff.

With the circuit in the condition just described, the next positive drive pulse produced on the drive pulse conductor 2665 in the manner explained above has the effect of increasing the cathode potential of the tube 2611 positively by an amount sufficient to cut off space current flow through this tube. In response to this operation, current flow through the resistor **2646*a* is increased to decrease the bias on the control grid of the tube 2601 sufficient to render the latter tube conductive. As the tube 2601 starts to conduct, its anode becomes less positive due to the voltage drop across the inductance element 2644*a* and the resistor 2643*a*, with the result that a negative pulse is transmitted through the condenser 2645*a* to the control grid of the next on-string tube 2602. This pulse is of sufficient amplitude to drive the control grid of the tube 2602 beyond cutoff. As a consequence, the tube 2602 stops conducting and the anode potential thereof rises to increase the positive potential on the control grid of the companion off-string tube 2612. So long as the positive drive pulse persists on the conductor 2665 to hold the cathode potential of the tube 2612 at a high positive level, the tube cannot conduct even though the control grid potential is positively increased in the manner just described. However, when the drive pulse on the conductor 2665 ends, the cathode potential of the tube 2612 drops sufficiently to render this tube conductive under the influence of the increased positive potential impressed on the control grid of the tube from the anode of the tube 2602. As soon as the tube 2612 starts to conduct, the voltage drop across the resistor 2646*b* is decreased to a value such that the tube 2602 remains biased beyond cutoff from the negative one hundred volts bias potential source. Thus, the tube 2602 is held nonconductive after the pulse transmitted to the control grid thereof through the condenser 2645*a* ends. In this connection, it is pointed out that the condenser 2645*a* is chosen to have a capacitance value such that the negative pulse impressed upon the control grid of the tube 2602 cannot die out to render this tube conductive before the driving pulse on the conductor 2665 ends. This condenser is also made small enough so that it is fully discharged before it is again called upon to deliver a negative pulse to the control grid of the tube 2602**.

When the tube 2601 is rendered conductive to reduce the anode potential thereof in the manner just explained, the potential on the control grid of the tube 2611 is reduced to a value such that when the drive pulse on the conductor 2665 ends the tube 2611 is still biased beyond cutoff. Thus current conduction through the tube 2601 has the effect of preventing current flow through the tube 2611 after the pulse on the drive conductor 2665 is terminated.

In a manner entirely similar to that just described, the next succeeding pulse developed on the drive conductor 2665 has the effect of arresting current conduction through the tube 2612, starting current conduction through the tube 2602, arresting current conduction through the tube 2603 and starting current conduction through the tube 2613. The manner in which additional pulses appearing on the drive conductor 2665 successively activate the fourth to tenth stages of the ring circuit will be entirely apparent from the preceding explanation. In this regard, it is noted that when the tenth pulse is delivered to the ring circuit from the drive conductor 2665 to cut off space current conduction through the tube 2710 and render the tube 2700 conductive, a negative pulse is transmitted through the condenser 2744*j* to cut off space current flow through the tube 2601, with the result that this tube is rendered non-conductive and the tube 2611 is rendered conductive when the tenth drive pulse on the drive conductor 2665 ends.

From the above explanation it will be apparent that as successive drive pulses appear on the drive conductor 2665, the ten stages of the ring circuit comprising the two upper horizontal tube strings are sequentially activated. In order to prevent more than one stage of the ring circuit from responding to any given drive pulse, the resistors 2663 and 2664 are so proportioned that if two of the off-string tubes 2611, 2612–2710 start to conduct simultaneously a voltage drop is produced across these resistors which has the effect of biasing both of the conducting tubes beyond cutoff. As a practical matter, this is accomplished by adjusting the short circuiting wiper 2664*a* along the resistor 2664 to a point where current flow through any one of the tubes 2611, 2612–2710 and the resistors 2663 and 2664 has the effect of biasing these tubes fairly close to the cutoff point. It will be understood that with the circuit adjusted in this manner, positive drive pulses of relatively low amplitude appearing on the drive conductor 2665 will have the effect of switching the ring circuit in the manner explained above. Another important feature of the ring circuit is the use of coupling condensers 2645*a*, 2645*b*, 2645*c*–2744*j* connected between the anodes and control grids of successive tubes 2601, 2602, 2603–2700 of the on-string rather than between successive tubes 2611, 2612, 2613–2710 of the off-string. This arrangement is of importance for the reason that since the tubes of the off-string are normally biased considerably beyond cutoff, a relatively large change in the potentials on the control grids thereof would be required to effect the described stage switching operations in response to delivery of successive drive pulses to the ring circuit. On the other hand, the control grids of the on-string tubes 2601, 2602, 2603–2700 are normally biased to saturation through the resistors 2646*a*, 2646*b*, 2646*c*–2746*j*. As a consequence, delivery of a small negative pulse to the control grid of any on-string tube, as to the control grid of the tube 2602 through the condenser 2645*a*, for example, has the effect of cutting off space current flow through the tube.

In considering the manner in which the step-by-step operation of the ring circuit results in the production of positive and negative units pulses successively on the negative units pulse conductors 30 and the positive units pulse conductors 31, it is first pointed out that normally the amplifier and inverter tubes 2621, 2622, 2623–2720 are conducting heavily. Thus, the control grids of these tubes are respectively connected through the grid current limiting resistors 2652*a*, 2652*b*, 2652*c*–2752j directly to the positive terminal of the anode current source, so that heavy grid and anode current flow in these tubes. On the other hand, the tubes 2631, 2632, 2633–2730, constituting the output string, are normally biased beyond cutoff by the charges accumulated on the respective associated condensers 2655*a*, 2655*b*, 2655*c*–2755*j*.

With the ring circuit operating in the manner described above, negative pulses are developed on the negative units pulse conductors 30*a*, 30*b*, 30*c*–30*j* and positive pulses are developed on the positive units pulse conductors 31*a*, 31*b*, 31*c*–31*j* only when the respective corresponding tubes 2611, 2612, 2613–2710 are conducting. Thus a negative pulse is developed on the negative units pulse lead 30*a* and a positive pulse is developed on the positive units pulse lead 31*a* when the tube 2611 is rendered conductive under the influence of a driving pulse on the conductor 2665. More specifically, when the tube 2611 is rendered conductive to produce space current flow therethrough, the positive potential of its anode is decreased to transmit a negative pulse through the coupling condenser 2651*a* to the control grid of the tube 2621. This pulse, during its persistence interval, has the effect of decreasing space current flow through the tube 2621 to produce a corresponding increase in the positive anode potential of the tube. As a result, the pulse is inverted to a positive pulse and repeated in amplified form through the condenser 2655*a* to the control grid of the output tube 2631. This repeated positive pulse is of very large amplitude and has the effect of driving the control grid of the tube 2631 sufficiently positive to saturate space current flow through the tube. Thus, the tube 2631, which as explained above is normally cut off, is abruptly rendered conductive at its saturation level. During the conducting interval of the tube 2631, the condenser 2655*a* is heavily charged by grid current flow through this tube, such current flow occurring over a path which extends from positive terminal of the anode current source by way of the resistor 2653*a*, the inductance element 2654*a*, the condenser 2655*a*, the grid-cathode path in the tube 2631, and the resistor 2670*a* to the grounded negative terminal of the anode current source. As a result of the heavy anode current flow thus produced through the tube 2631, the voltage drop across the cathode resistor 2670*a* is sharply increased to produce the desired positive pulse on the units pulse conductor 31*a*. Concurrently therewith, the voltage drop across the anode load resistor 2671*a* is sharply increased to correspondingly decrease the potential on the negative units pulse conductor 30*a* and thus develop the desired negative pulse on this conductor. As shown in Figs. 13 to 16, inclusive, these pulses are produced in time position 62*a*, 62*b*, 62*c*, etc., of each pulse frame.

The duration of the pulses thus developed on the units pulse conductors 30*a* and 31*a* is measured by the spacing interval between two successive drive pulses appearing on the ring drive conductor 2665. Thus when the next succeeding drive pulse is developed on this conductor to render the tube 2611 non-conductive in the manner explained above, the positive anode potential of this tube is sharply increased to produce a corresponding sharp increase in current flow through the tube 2621. As a result, the positive anode potential of the tube 2621 is sharply decreased. More specifictlly, the voltage at the anode of the tube 2621 is less than the voltage across the condenser 2655*a*, which is now negatively applied to the control grid of the tube 2631, by an amount sufficient to cut off space current flow through the latter tube. As a consequence, the voltage drops across the resistors 2670*a* and 2671*a* are sharply decreased to their reference value levels to terminate the pulses on the conductors 30*a* and 31*a*.

In a manner entirely similar to that just described, negative and positive units pulses are respectively produced on the conductors 30*b* and 31*b* in time positions 63*a*, 63*b*, 63*c*, etc., during successive intervals of conduction of the tube 2612. Similarly, positive and negative pulses are respectively produced on the conductors 31*c* and 30*c* in the time positions 64 during those intervals when the tube 2613 is conducting. Thus it will be understood that negative units pulses are successively produced on the conductors 30*a*, 30*b*, 30*c*–30*j* and positive units pulses are concurrently produced on the conductors 31*a*, 31*b*, 31*c*–31*j* in the manner illustrated in the pulse shart shown in Figs. 13 to 16, inclusive, during sustained operation of the ring circuit.

As will be apparent from the preceding explanation, the units pulses produced by each of the tubes 2631, 2632, 2633–2730 are developed by switching each tube from a completely non-conductive state to a condition where anode current flow through the tube is at the saturation level. This insures the production of units pulses of uniform amplitude having clean tops. As will also be apparent from the preceding explanation, each of the coupling condensers 2651*a*, 2651*b*, 2651*c*–2751*j* is only required to hold the control grid potential of the associated one of the tubes 2621, 2622, 2623–2720 at the pulse producing level for an interval equal to the period separating two successive pulses on the drive conductor 2665. Accordingly, these condensers may be relatively small. During the interval separating pulse transmission by each of these condensers and equal to the sum of nine units pulse periods, each condenser is fully discharged through one of the respective associated resistors 2652*a*, 2652*b*, 2652*c*–2752*j*. On the other hand, each of the condensers 2655*a*, 2655*b*, 2655*c*–2655*j* is required to hold its charge during each spacing interval separating two pulse transmission periods thereof, i.e., during intervals each equal to the sum of nine units pulse periods. Accordingly these condensers are relatively large. During such spacing intervals these condensers discharge through their respective associated resistors 2656*a*, 2656*b*, 2656*c*–2756*j* which are connected to a positive 150 volt grid bearing supply through a pair of normally closed contacts 1103. However, these resistors have very high resistance values such that the condenser discharge rate is low. The inductance elements, such as the elements 2644*a*, 2648*a*, and 2654*a*, respectively provided in the anode circuits of the tubes forming the upper three rows serve the function of preventing width distortion of the pulses. Each of these elements is self resonant at a frequency of four to five megacycles.

As indicated above, the circuit arrangement of the tens pulse ring circuit 21 and the mode of operation of this circuit to produce the positive tens pulses successively on the conductors 33*a*, 33*b*–33*j*, and the positive tens pulses successively on the conductors 32*a*, 32*b*–32*j* are identical with the circuit arrangement and mode of operation of the units pulse ring circuit 20 just described. However, the driving pulses for the tens pulse ring circuit 21 are derived from the tenth units pulse forming and gating stage of the units pulse ring circuit 20. More specifically, the positive units pulses appearing on the units pulse conductor 31*j* are employed to drive the ring circuit 21 through the pulse differentiating circuit 2701 which functions to differentiate the leading edge of each pulse. It will be understood, therefore, that the stage switching operations effected in the tens pulse ring circuit 21 occur at one tenth the stage switching rate employed in the units pulse ring circiut 20. In other words, one positive and concurrent negative tens pulse is produced for each ten units pulses developed by the units pulse ring circuit 20. Due to the longer time intervals involved in the stage switching operations of the tens pulse ring circuit 20, the circuit constants of certain of the circuit components embodied in this circuit are different from those of the corresponding components of the units pulse ring circuit. This is particularly true of those condensers of the tens pulse ring circuit 21 which respectively correspond to the condensers 2650*a*, 2651*a* and 2655*a*, and those resistors of the tens pulse ring circuit which respectively correspond to the resistors 2668 and 2663 of the units pulse ring circuit 20. Aside from the differences noted, the two ring circuits 20 and 21 are identical and it is believed that the mode of operation of the tens pulse ring circuit will be readily apparent from the explanation given above with reference to the units pulse ring circuit 20.

*Channel pulse commutator 22*

Figure 8:
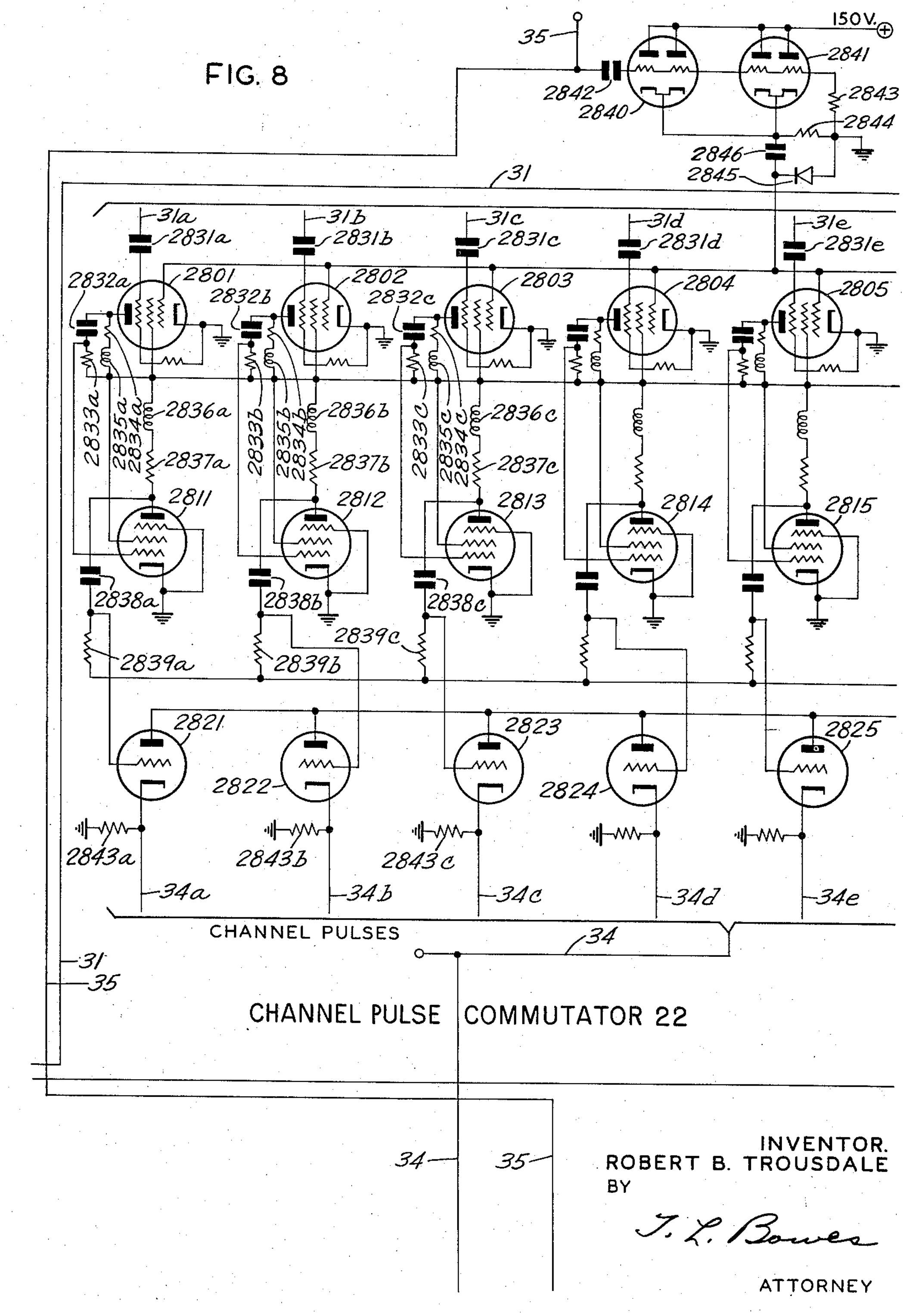
Figure 9:
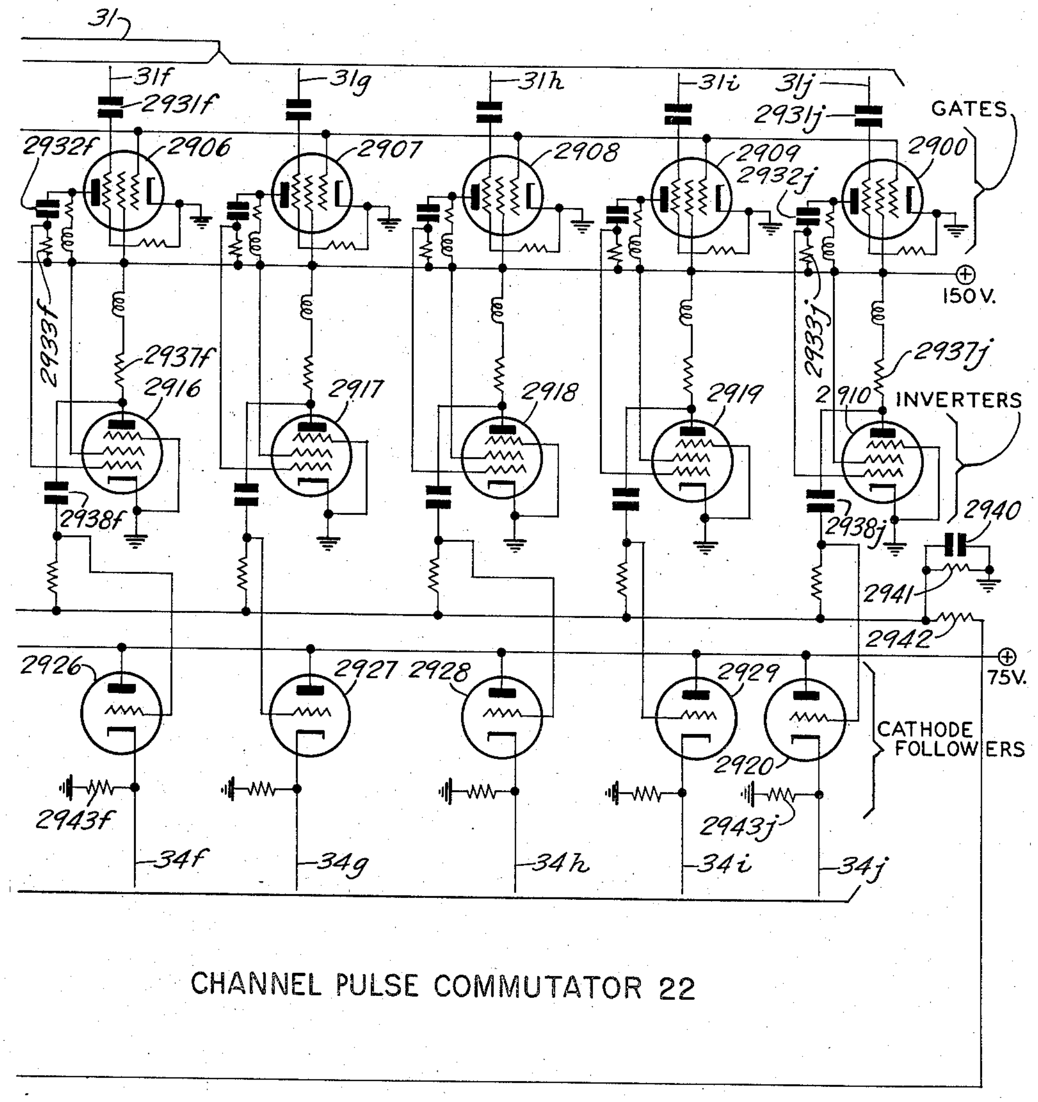

As generally indicated above, this circuit is provided sequentially to gate the pulses developed in the pulse forming channel 3400*a* over the conductors 34*a*, 34*b*–34*j* to the multiplexer 11. In brief, this circuit, the details of which are illustrated in Figs. 8 and 9 comprises two parallel connected cathode follower tubes 2840 and 2841, to which drive pulses are delivered from the commutator drive circuit 25 over the conductor 35; ten pulse gating tubes 2801, 2802, 2803, 2804, 2805, 2906, 2907, 2908, 2909, and 2900, which are jointly controlled by the drive pulses repeated thereto by the tubes 2840 and 2841 and also by positive units pulses delivered thereto over the units pulse conductors 31*a*, 31*b*–31*j* sequentially to gate the drive pulses to ten inverter and amplifier tubes 2811, 2812, 2813, 2814, 2815, 2916, 2917, 2918, 2919, and 2910; and ten cathode follower tubes 2821, 2822, 2823, 2824, 2825, 2926, 2927, 2928, 2929, and 2920, to which the amplified pulses are sequentially repeated by the inverter tubes 2811, 2812–2910. Effectively, therefore, the channel pulse commutator 22 is comprised of ten pulse gating stages, the first of which comprises the three vertically aligned tubes 2801, 2811, and 2821, the second of which comprises the three vertically aligned tubes 2802, 2812, and 2822, and so on to the last stage, which comprises the tubes 2900, 2910, and 2920. The cathode follower tubes 2840 and 2841 are twin triodes of the 6J6 type, the ten gating tubes 2801, 2802–2900 are pentodes of the 6AS6 type, the inverter and amplifier tubes 2811, 2812–2910 are pentodes of the 6AK6 type, and the cathode follower tubes are triodes of any suitable commercial type. If desired, five triodes of the 6AS7 type may be employed to replace the triodes 2821, 2822–2920 in pairs; that is, five twin triodes of the 6AS7 type may be used in lieu of the ten triodes shown. The circuit components employed to couple the identified tubes of the channel pulse commutator 22 with the units pulse ring circuit 20, the commutator drive circuit 25 and with each other are identified below in terms of the functions which they respectively perform in the network.

Normally, i.e., in the absence of pulses on the drive conductor 35, the control grids of the cathode follower tubes 2840 and 2841 are negatively biased with respect to the cathodes of these tubes through the resistor 2843 by an amount equal to the voltage drop across the cathode load resistor 2844. The control grids of the gating tubes 2801, 2802–2900 are connected in parallel and coupled to the load terminal of the cathode load resistor 2844 through a coupling condenser 2846. The manner in which these control grids are normally biased to the same predetermined operating potential is explained more fully below. Positive units pulses are sequentially impressed upon the suppressor grids of the gating tubes 2801, 2802–2810 over the positive units pulse conductors 31*a*, 31*b*–31*j* and through the coupling condensers 2831*a*, 2831*b*–2931*j*. From an inspection of the circuit, it will be noted that the control grids of the amplifier and inverter tubes 2811, 2812–2910 are connected directly to the positive terminal of the anode current source through the resistors 2833*a*, 2833*b*–2933*j* Thus, these tubes are normally heavily conductive, the control grids thereof being biased positively relative to the tube cathodes to produce grid current flow through the tubes which is limited only by the resistors 2833*a*, 2833*b*–2933*j*. The normal bias for the control grids of the ten cathode follower tubes 2821, 2822–2920 is in part determined by the voltages respectively developed across the coupling condensers 2838*a*, 2838*b*–2938*j* during operation of the circuit and also by a fixed bias voltage derived from a biasing network which comprises the series connected resistors 2941 and 2942 and a by-pass condenser 2940. These voltage dividing resistors are connected to a source of a normal operating voltage of 10 volts negative through a pair of normally closed contacts 1101.

In considering the operation of the commutator 22, it will be understood that the drive pulses transmitted from the commutator drive circuit 25 over the conductor 35 and impressed upon the control grids of the tubes 2840 and 2841 through the coupling condenser 2842 are repeated as positive pulses across the cathode load resistor 2844.

These pulses are impressed upon the parallel connected control grids of the gating tubes 2801, 2802–2900 through the coupling condenser 2846. They occur at a frequency rate of one megacycle and, as will be apparent from the preceding explanation, are synchronized with the positive units pulses successively impressed upon the control grids of the gating tubes over the conductors 31*a*, 31*b*–31*j*. Thus each of the gating tubes 2801, 2802–2900 has a positive units pulse impressed upon the suppressor grid thereof in synchronism with each tenth drive pulse impressed upon its control grid through the coupling condenser 2846. Moreover, and as explained above, each drive pulse is time positioned to occur at the approximate center of the coincident units pulse. Normally the gating tubes 2801, 2802–2900 are biased well beyond cutoff by the voltage developed across the condenser 2846 and negatively applied to the control grids of the gating tubes during each off-pulse period. More specifically, each time a positive pulse appears across the cathode load resistor 2844, the condenser 2846 is rapidly charged through the clamping crystal rectifier 2845. When the pulse terminates, the condenser 2846 cannot discharge through the rectifier 2845 and has a voltage thereacross which is substantially greater than the normal off-pulse voltage across the resistor 2844. This condenser voltage is applied negatively to the control grids of the ten gating tubes 2801, 2802–2900 and is so much greater than the voltage across the resistor 2844 that the gating tubes are biased beyond cutoff. Thus the rectifier 2845 functions to clamp the drive pulse reference line voltage at a fixed negative value equal to the amplitude of the drive pulses. The amplitudes of the positive units pulses successively applied to the suppressor grids of the ten gating tubes must be larger than the cutoff potential of the suppressor grids of the gating tubes. In other words, the magnitude of the positive units pulses is sufficient to cause plate current cutoff between pulses in spite of any control grid action. However, and considering the first stage of the commutator 28 by way of example, when a drive pulse is applied to the control grid of the tube 2801 coincident with the application of a positive units pulse to the suppressor grid of this tube, the tube is rendered conductive for the very short interval during which the drive pulse persists. This same action occurs successively at the other nine stages of the commutator 22 as drive and units pulses are coincidentally applied to the control and suppressor grids of the gating tubes 2802, 2803–2900. When the tube 2801 is thus rendered conductive, the anode potential thereof drops abruptly to repeat the drive pulse negatively through the coupling condenser 2832*a* to the control grid of the amplifier and inverter tube 2811. As a result, space current flow through the tube 2811 is abruptly decreased at the start of the pulse and abruptly increased at the end of the pulse. Tremendous pulse amplification is obtained in the tube 2811. Since space current flow through this tube is sharply decreased during the pulse period to effect a sharp increase in the anode potential of the tube, it will be understood that the pulse is repeated positively through the coupling condenser 2838*a* to the control grid of the cathode follower tube 2821. The magnitude of this repeated pulse is sufficient to drive the control grid of the tube 2821 positive relative to the cathode of the tube, thereby to produce grid current flow in the tube. This current charges the coupling condenser 2838*a*. During the pulse interval, the tube 2821 conducts heavily to repeat the pulse across its cathode load resistor 2843*a*. Thus a drive pulse having the persistence interval of the drive pulse impressed upon the control grid of the gating tube 2801 is developed positively on the channel pulse conductor 34*a*. After the drive pulse ends, such that the gating tube 2801 is again biased below cutoff and normal heavy space current flow through the amplifier and inverter tube 2811 is resumed, the condenser 2838*a* is left charged to a voltage which biases the cathode follower tube 2821 considerably beyond cutoff. Thus the latter tube is rendered non-conductive immediately the pulse ends. The condenser 2838*a* holds its charge until the tubes 2801 and 2811 are again activated to transmit a pulse through this condenser to the control grid of the cathode follower tube 2821. The fixed bias impressed upon the cathode follower tubes from the bleeder resistors 2941 and 2942 prevents these tubes from losing bias and drawing excessive current when either gate or driving pulses are missing.

The manner in which the nine other stages of the commutator 22 function successively to produce pulses on the other nine channel pulse conductors 34*b*, 34*c*–34*j* is exactly the same as the described mode of operation of the first commutator stage and will readily be understood from the preceding explanation. It will thus be understood that during operation of the system the commutator 22 functions continuously to commutate channel pulses 82*a*, 83*a*, 84*a*, etc., to the ten channel pulse conductors 34*a*, 34*b*–34*j* in sequence. These pulses are of positive polarity and each thereof has a persistence interval of one-fifth of a microsecond. In order to prevent width distortion of the pulses as the described pulse commutating action is effected in the commutator 22, inductance elements 2835*a*, 2836*a*, 2835*b*, 2836*b*, etc., each self-resonant at a frequency of from four to five megacycles, are respectively provided in the anode circuits of the gating and inverter tubes in the manner illustrated. It will be understood from the above explanation and consideration of the pulse chart shown in Figs. 13 to 16, inclusive, that while the pulses are produced at the fundamental frequency rate of one megacycle, they recur on each of the channel pulse conductors 34*a*, 34*b*–34*j* at a frequency rate of one hundred kilocycles.

*Alarm circuit 300*

Figure 11:
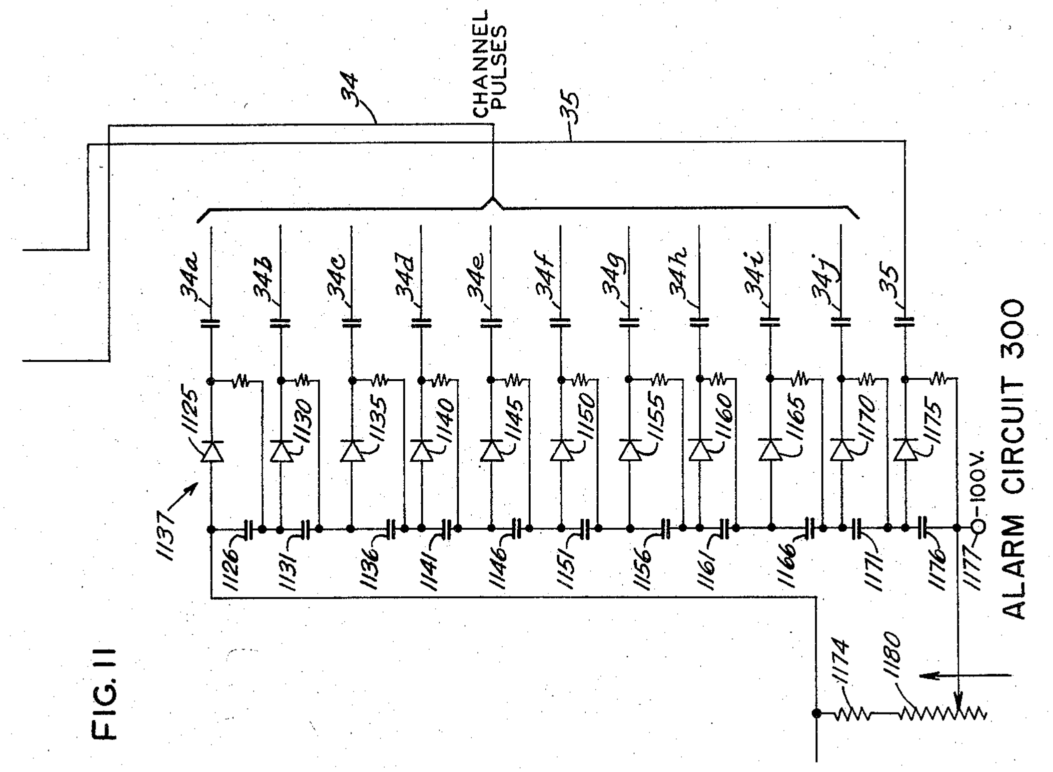
Figs. 10 and 11 are circuit diagrams of an alarm circuit controlled by and controlling the operation of the pulse generating means shown in Figs. 6 to 9, inclusive.
Figure 10:
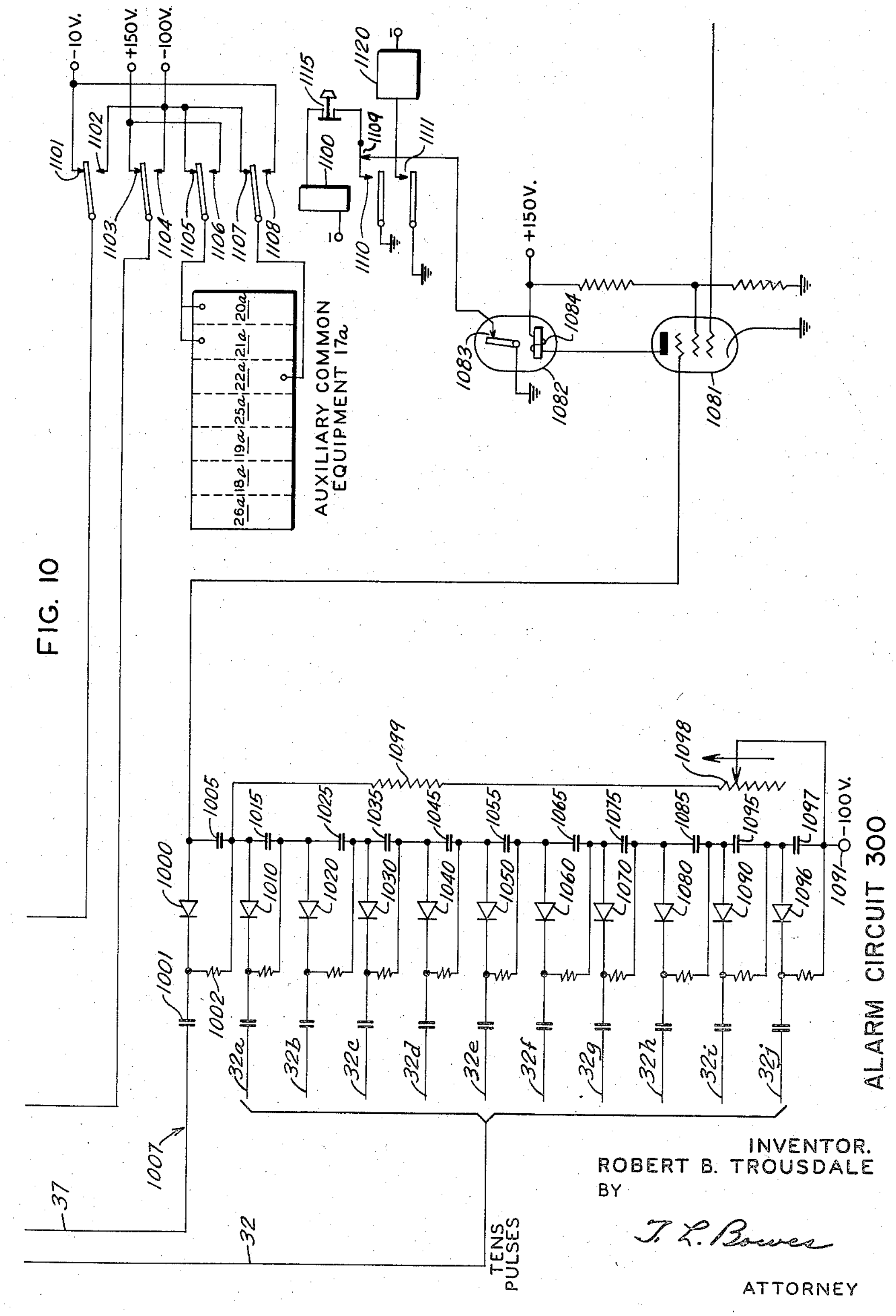
Figure 13:
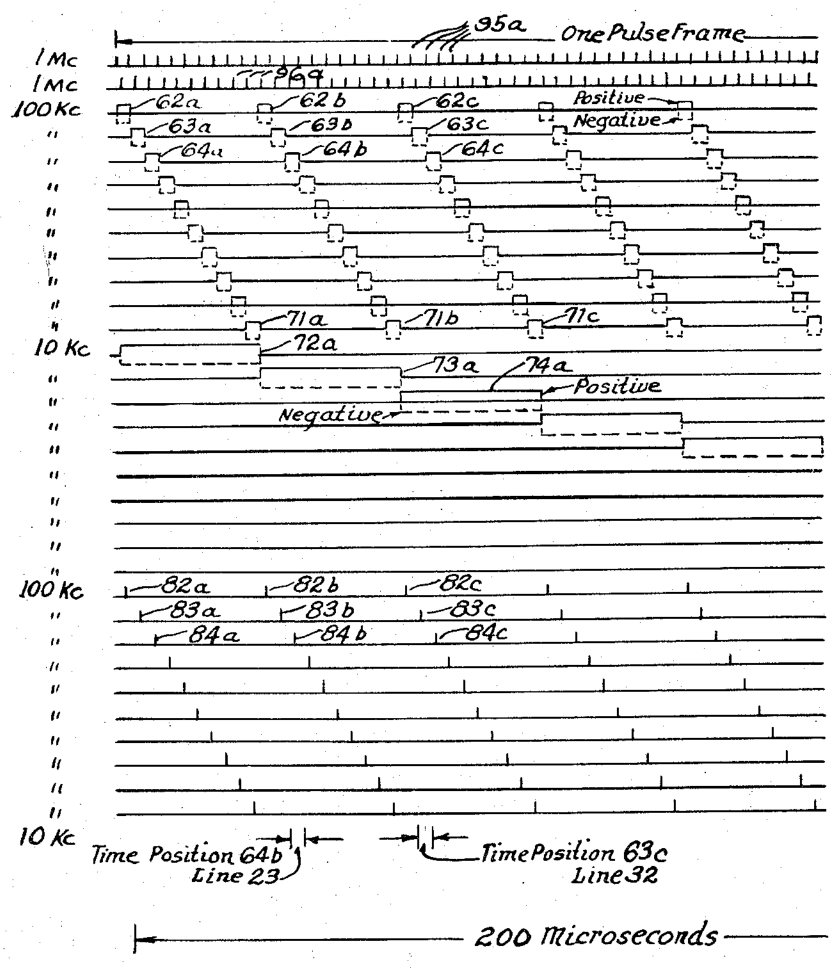
Figs. 13 to 16, inclusive, when laid side by side in the order named, graphically illustrate the time relationship between certain of the pulses developed by and utilized in the various components of the automatic telephone system.
Figure 14:
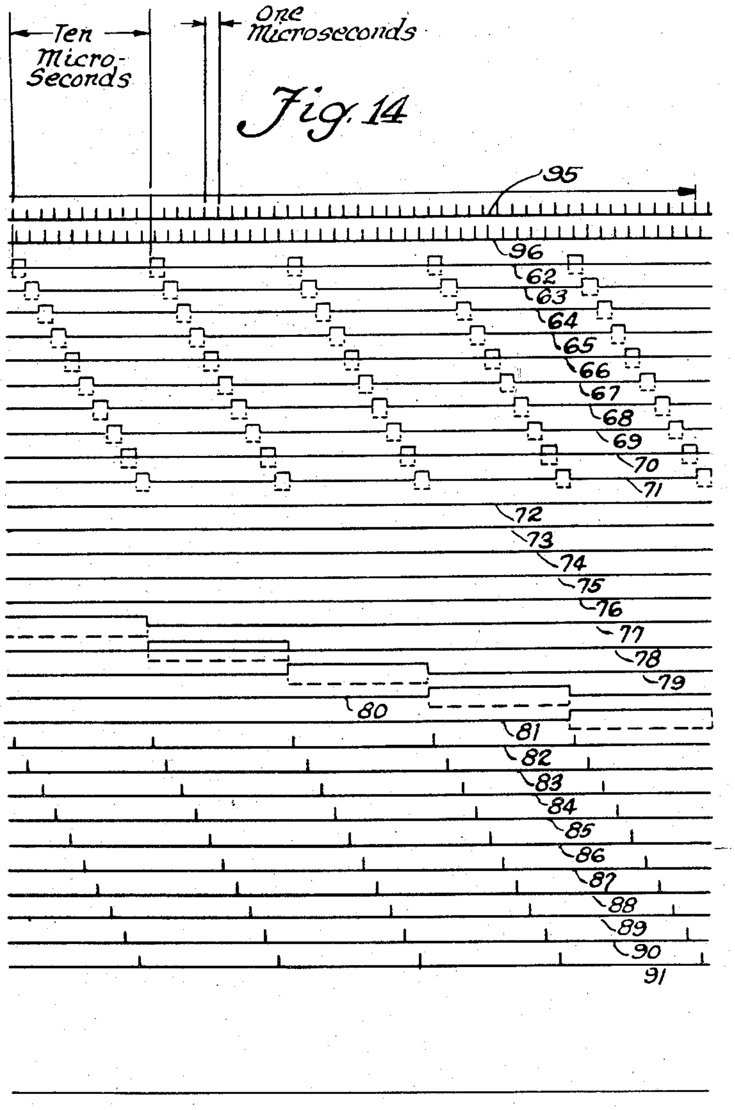

The alarm circuit 300 (Figs. 10 and 11) is selectively energized under the control of the positive pulses produced by the tens pulse ring circuit 21, the channel pulse commutator 22, the bias and ringing carrier supply 26, and the commutator drive circuit 25, and includes relay means for controlling the application of either a normal operating or a standby biasing voltage to the output tubes in the units pulse ring circuit 20, the tens pulse ring circuit 21, and the channel pulse commutator 22. In response to the failure of any of the above listed generating means to provide the necessary output pulses, the relay means in the alarm circuit 300 is operated to bias the normally operative pulse generating components to a standby condition, to apply a normal operating bias to the pulse generating components forming the common equipment 17*a* and to energize an audible or visible alarm circuit 1120 to provide an indication that the primary pulse generating components of the automatic telephone system have been rendered inoperative.

Generally, the alarm circuit 300 includes a normally conductive tube 1081, the control grid of which is supplied with a biasing potential by a biasing circuit 1137 and the suppressor grid of which is supplied with a biasing potential by a biasing circuit 1007. The circuits 1007 and 1137 are responsive to the pulses generated by the biasing and ringing carrier supply circuit 26, the units pulse ring circuit 20, the tens pulse ring circuit 21, the channel pulse commutator 22, and the commutator drive circuit 25 so that, in response to the failure of any one of these pulses, the bias supplied by one of these networks is reduced so as to render the tube 1081 non-conductive. The termination of the flow of current through the tube 1081 releases a normally operated relay 1082 so that a control relay 1100 is operated.

The relay 1100, in its released condition, applies a normal operating potential to the output means associated with the pulse generating means in the common equipment 17 and provides a standby potential to the pulse generating means forming the auxiliary common equipment 17*a*. In operating, the relay 1100 removes the operating potential from the generating components of the common equipment 17 and applies it to the identical generating components forming the auxiliary common equipment 17*a* so that these components are rendered effective to supply pulses to the automatic telephone system. Simultaneously with rendering the auxiliary common equipment 17*a* operative, the relay 1100 applies a standby potential to the pulse generating components of the common equipment 17 so that the output means thereof are rendered ineffective. Also, the relay 1100 in operating energizes the alarm circuit 1120 to provide a visual or an audible indication of the fact that the normally operative pulse generating components associated with the automatic telephone system have been rendered ineffective.

The time response of the biasing circuits 1007 and 1137 together with that of the tube 1081 and the relays 1082 and 1100 is fast enough that the auxiliary common equipment 17*a* is rendered effective within the one-quarter second time delay provided by the +B switching circuit 201 in each of the finders 12*a*, 13*a*, and 14*a* of the system so that none of the established or partially established connections are released in response to the failure of any of the pulse generating means. The alarm circuit 300 may be manually or automatically reset to its normal operating condition following the repair or replacement of the faulty components of the common equipment 17.

More particularly, the alarm circuit 300 includes a rectifier 1000 which is connected to the 100 kc. output of the bias and ringing carrier supply 26 through a coupling condenser 1001 and the conductor 37. The signal provided by the bias and ringing carrier supply 26 is conducted through the rectifier 1000 to charge a condenser 1005 to a voltage proportional to the amplitude of the output of the supply circuit 26. A resistor 1002 interconnects the input of the rectifier 1000 with the next adjacent condenser. The voltage on this condenser is applied through the resistor 1002 to establish a direct current voltage level at the input of the rectifier 1000. Accordingly, when the condenser is charged by the pulses applied from the circuit 26, the total voltage at the positive plate of the condenser 1005 is the arithmetical sum of the incremental charge coupled through the rectifier 1000 and the magnitude of the direct current voltage applied through the resistor 1002.

The biasing circuit 1007 is also provided with the positive pulse output of the tens pulse ring circuit 21 through the cable 32. More particularly, the positive pulses appearing on the conductors 32*a–j*, inclusive, are transmitted through a plurality of rectifiers 1010, 1020, 1030, 1040, 1050, 1060, 1070, 1080, 1090, and 1096 to charge a plurality of condensers 1015, 1025, 1035, 1045, 1055, 1065, 1075, 1085, 1095, and 1097, respectively. Each of these rectifiers is provided with a resistor similar to the resistor 1002 to provide a path for establishing a direct current voltage level at the input thereto which is equal to the voltage at the plate of the adjacent condenser. When the tens pulse ring circuit 21 and the bias and ringing carrier supply circuit 26 are functioning properly, a positive voltage is developed across the plurality of charged condensers which is applied to the suppressor grid of the tube 1081. Since this positive voltage is so large that the loss of the voltage across any one of the charged condensers would be insufficient to cut off the tube 1081, a terminal 1091 is connected to a negative voltage supply in order to reduce the effective voltage applied to the suppressor grid of the tube 1081 to such a value that the loss of the voltage across any one of the charged condensers is sufficient to render the tube 1081 non-conductive.

In order to adjust the voltage applied to the suppressor grid of the tube 1081 and to provide a means for discharging the series connected charged condensers, a fixed resistor 1099 and a variable resistor 1098 are connected in series across the condensers 1015, 1025, 1035, 1045, 1055, 1065, 1075, 1085, 1095, and 1097. These resistors operate in conjunction with the internal resistance provided by the charged condensers and the charging circuits associated therewith to provide a voltage divider network and adjustment of the variable resistor 1098 provides a manually adjustable control for selecting a desired operating voltage for the suppressor grid of the tube 1081. This voltage is so selected that the failure of the output provided by any of the pulse generating circuits of the tens pulse ringing circuit 21 or the output of the bias and ringing carrier supply 26 reduces the voltage applied to the suppressor grid so that plate current in the tube 1081 is terminated. It should be noted that since the tens pulse ring circuit 1021 is driven by one of the output pulses developed by the units pulse ring circuit 20, the failure of the output of the units pulse ring circuit 20 is indicated by a corresponding failure of the tens pulse ring circuit 21.

The biasing circuit 1137 includes a plurality of condensers 1126, 1131, 1136, 1141, 1146, 1151, 1156, 1161, 1166, and 1171 which are selectively charged in response to the positive pulses applied to a plurality of rectifiers 1125, 1130, 1135, 1140, 1145, 1150, 1155, 1160, 1165, and 1170 by the conductors 34*a–j*, inclusive, respectively, which form the cable 34 interconnecting the biasing circuit 1137 with the channel pulse commutator 22. The biasing circuit 1137 also includes a condenser 1176 which is charged in response to the positive pulses applied to a rectifier 1175 by the conductor 35 which is connected to the commutator drive circuit 25. The large positive voltage provided by this plurality of charged condensers is reduced to the desired value by the serial interconnection of these charged condensers with a terminal 1177 to which is connected 100 volts negative. Also, each of the rectifiers in the circuit 1137 is provided with a resistor similar to the resistor 1002 to provide a direct current path for establishing a level of direct current voltage at the input of each of the rectifiers in accordance with the magnitude of the voltage at the interconnected plate of the adjacent charged condenser.

To provide a means for securing a fine adjustment of the voltage applied to the control grid of the tube 1081 by the biasing circuit 1137, a fixed resistor 1174 and a variable resistor 1180 are connected in parallel with all of the charged condensers. These resistors cooperate with the resistance inherent in the circuits associated with the charged condensers to provide a potentometer in which the adjustment of the varibale resistor 1180 selects the desired voltage to be applied to the control grid of the tube 1081. The magnitude of the voltage provided by the biasing circuit 1137 is so selected that the loss of the voltage across any of the normally charged condensers is sufficient to reduce the bias supplied to the control grid enough that the plate current in the tube 1081 is terminated. Accordingly, the loss of the voltage across any of the normally charged condensers in the biasing circuits 1007 and 1137 interrupts the plate current of the tube 1081 to indicate that one or more of the output pulses from the pulse generating components of the common equipment is absent.

In response to the loss of the necessary operating voltage on either the suppressor grid or the control grid, the plate current through the tube 1081 and, accordingly, through an operating winding 1084 of the relay 1082, is interrupted to release this relay. The release of the relay 1082 closes a pair of contacts 1083 so that ground is applied through a pair of normally closed contacts 1109 and a manual switch 1115 to the operating winding of the relay 1100. The application of ground to the operating winding of the relay 1100 operates this relay to close a plurality of contacts 1102, 1104, 1106, 1108, 1110, and 1111 and to open a plurality of contacts 1101, 1103, 1105, 1107, and 1109. The closure of the make-before-break contacts 1110 completes a locking circuit for the relay 1100 so that this relay remains operated following the opening of the contacts 1109.

The opening of the contacts 1101 removes the normal operating voltage from the control grids of the plurality of cathode follower tubes 2821, 2822, 2823, 2824, 2825, 2926, 2927, 2928, 2929, and 2920, and the closure of the contacts 1102 applies a large negative standby voltage thereto. The standby voltage applied to the potentiometer provided by the resistors 2941 and 2942 is of a large enough negative value that even though the remainder of the channel pulse commutator 22 is operating, the positive pulses coupled to the control grid of each of the cathode follower tubes are insufficient to drive these tubes into conduction. Therefore, it is possible to adjust the channel pulse commutor 22 for proper operation without pulses being supplied therefrom to the automatic telephone system.

The opening of the contacts 1103 removes the positive normal operating bias from the control grids of the plurality of tubes forming the cathode output string in both the units pulse ring circuit 20 and the tens pulse ring circuit 21, and the closure of the contacts 1104 connects a large negative voltage to these control grids so that, even though the remainder of the units pulse ring circuit 20 and the tens pulse ring circuit 21 in normally operative, these pulse generating components are rendered ineffective to transmit either positive or negative pulses to the automatic telephone system. This is true inasmuch as the negative voltage applied to the plurality of control grids is of a large enough magnitude that the positive pulses generated by the amplifier and inverter string in the circuits 20 and 21 is of insufficient magnitude to drive the tubes forming the cathode output strting into conduction.

The opening of the contacts 1105 and the closure of the contacts 1106 removes the standby potential and applies a normal operating potential, respectively, to the control electrodes of the cathode output strings in the units pulse ring circuit **20*a* and the tens pulse ring circuit 21*a* forming a portion of the auxiliary common equipment 17*a* so that these two pulse generating components are rendered effective to supply the necessary pulses for continued operation of the automatic telephone system. Although the details of the pulse generating components of the auxiliary common equipment 17*a* are not disclosed in Fig. 10 of the drawings, it is to be understood that the components forming the common equipment 17*a* are identical to those disclosed in Figs. 6 to 9, inclusive, and, in the drawings of the copending application of Frank A. Morris and Robert B. Trousdale, Serial No. 134,974, referred to above. The auxiliary units pulse ring circuit 20*a* and the auxiliary tens pulse ring circuit 21*a* are normally operative, but pulses are not supplied from the outputs thereof inasmuch as the standby potential transmitted through the normally closed contacts 1105 to the control grids of the tubes forming the cathode output string in each of these circuits is of such magnitude as to render the tubes nonconductive even though positive pulses are being applied thereto from the remainder of the ring circuits. Accordingly, the application of a normal operating voltage thereto in response to the closure of the contacts 1106 renders the circuits 20*a* and 21*a* immediately effective to supply pulses to the automatic telephone system. In view of this instantaneous response of the pulse generating components 20*a* and 21*a***, a completely or partially established connection in the automatic telephone system will not be released inasmuch as these connections are maintained by the +B switching circuit for a time interval of approximately one-quarter of a second.

The opening of the contacts 1107 and the closure of the contacts 1108 remove the standby potential and apply a normal operating potential, respectively, to the channel pulse commutator **22*a* forming a portion of the auxiliary common equipment 17*a*. Since the auxiliary channel pulse commutator 22*a* is normally in an operative condition, with the exception of the plurality of tubes forming the cathode follower outputs which are normally biased into a non-conductive state, the application of a normal operating bias to the control electrodes of these cathode follower tubes renders the channel pulse commutator 22*a* immediately effective to supply the necessary channel pulses to the automatic telephone system. Since these channel pulses are employed in the multiplexer 11 to develop multiplexer pulses in the time positions assigned to the calling and called lines of the system, multiplexer pulse transmission is also resumed immediately the contacts 1108** are closed.

The closure of the contacts 1111 applies ground to the alarm circuit 1120 so that either a visible or audible major alarm is provided for indicating to the supervisory personnel that some portion of the pulse generating components of the common equipment 17 are operating improperly in failing to supply one of the pulses necessary for satisfactory operation of the automatic telephone system. Following the replacement or repair of the defective component, the switch 1115 is manually depressed to interrupt the locking circuit for the relay 1100.

The interruption of the locking circuit for the relay 1100 releases this relay to close the contacts 1101, 1103, 1105, 1107, and 1109 and to open the contacts 1102, 1104, 1106, 1108, 1110, and 1111. The release of the relay 1100 returns the pulse generating components of the auxiliary common equipment **17*a* to a standby condition and renders the pulse generating components of the common equipment 17** effective to supply the needs of the automatic telephone system.

Accordingly, the alarm circuit 300 provides circuit means responsive to the pulses supplied by the pulse generating components of the common equipment 17 and which is operated in response to the failure of any of these generating means for rendering the auxiliary common equipment **17*a* effective to supply pulses to the automatic telephone system and for rendering the common equipment 17 ineffective. It should be noted that although the biasing circuits 1007 and 1137 are only shown as being directly responsive to the output of the biasing and ringing carrier supply 26*a*, the units and tens pulse ring circuits 20 and 21, the commutator drive circuit 25 and the channel pulse commutator 22, the proper operation of these components is dependent upon the satisfactory operation of the master oscillator 18 and the phase shifter and pulse former 19 so that a failure of either of these last two components will produce an actuation of the alarm circuit 300**.

It is also within the scope of this invention to supply the alarm circuit 300 with pulses of different polarities and magnitudes from different portions of the automatic telephone system disclosed in the copending applications referred to above so that the failure of the system to supply pulses at varied points and time positions in these systems renders the auxiliary common equipment **17*a*** effective to supply the pulses required for satisfactory operation of the automatic telephone system.

Further, although the alarm circuit 300 has been shown in conjunction with an automatic telephone system utilizing both negative and positive pulses produced by the units and tens pulse ring circuits 20 and 21, this alarm circuit may be satisfactorily operated in conjunction with a system utilizing only positive units and tens ring pulses.

Although the principles of this invention have been described in conjunction with a single embodiment thereof, it is obvious that ones skilled in the art may devise other embodiments and modifications which will fall within the spirit and scope of the principles of this invention.

What is claimed and desired to be secured by Letters Patent of the United States is:

1. In an automatic telephone system, a first means for generating signals, electronic means for establishing a telephonic connection under the partial control of said signals, means included in said electronic means responsive to said signals and operative after a predetermined time interval following the absence of said signals for releasing said connection, a second means for generating signals, and means operated within said predetermined interval in accordance with the absence of said signals for rendering the second signal generating means effective to maintain said telephonic connection.

2. In an automatic telephone system, a first means for generating pulses, electronic means utilizing the pulses produced by said first generating means for establishing a telephonic connection, means controlled in accordance with said pulses for maintaining said connection for a predetermined period of time following the absence of any of said pulses, a second means for generating pulses, and means operated within said predetermined period and in accordance with the absence of any of said pulses for simultaneously rendering the first generating means ineffective to supply said connection maintaining means and the second generating means effective to supply said maintaining means whereby said connection is maintained in the event that the first generating means fails.

3. In an automatic telephone system utilizing pulses for establishing and maintaining telephonic connections, a first means for generating first pulses, a first output means normally operative to apply said first pulses to said system, a second means for generating second pulses, a second output means for applying said second pulses to said system, said second output means being normally rendered ineffective to apply said second pulses to said system, a voltage adding circuit energized by said first pulses to develop a control voltage proportional to the number of first pulses, and switching means operated in accordance with said control voltage for rendering said first output means ineffective and said second output means effective when the control voltage is varied in accordance with an abnormal condition in said first generating means.

4. In an automatic telephone system utilizing pulses for establishing and maintaining telephonic connections, a first means for generating first pulses, first electronic output means operated in accordance with said first pulses and connected to said system, said first output means normally being biased to transmit said first pulses to said system, second means for generating second pulses, second electronic output means operated in accordance with said second pulses and connected to said system, said second output means being normally biased to prevent transmission of said second pulses to said system, and means responsive to said first pulses for changing the biasing voltage on said first output means to prevent transmission of said first pulses to said system and to change the biasing voltage on said second output means to transmit said second pulses to said system.

5. In an automatic telephone system, a plurality of lines having individually assigned thereto different non-overlapping time positions in repetitive time position frames, a first common equipment including pulse generating means for repetitively producing pulses in said time positions, switching apparatus directively controllable in accordance with the time position individually assigned to said lines and utilizing said pulses for providing communication connections between different pairs of said lines, an auxiliary common equipment including pulse generating means for repetitively producing pulses in said time positions, and means for replacing said first common equipment with said auxiliary common equipment in response to an abnormal condition in said first common equipment.

6. The combination defined by claim 5 in which the replacing means includes means responsive to the pulses generated by the first common equipment.

7. In an automatic telephone system, a plurality of lines having individually assigned thereto different non-overlapping time positions in repetitive time position frames, common equipment including pulse generating means for repetitively producing pulses in said time positions, a second common equipment including pulse generating means for repetitively producing pulses in said time position, directively controlled electronic means normally operated in part in accordance with the pulses generated by said first common equipment for establishing telephonic connections between said lines, and means operated in response to the absence of one of said pulses in any of said time positions for supplying the electronic means with pulses from said second common equipment.

8. In an automatic telephone system, a plurality of lines having individually assigned thereto different non-overlapping time positions in repetitive time position frames, a first common equipment including pulse generating means for repetitively producing pulses in said time positions, a second common equipment including pulse generating means for repetitively producing pulses in said time positions, switching apparatus directively controllable in accordance with the time positions individually assigned to said lines and utilizing said pulses for providing communication connections between said lines, means for developing a control voltage in accordance with the pulses provided by one of said common equipments, and means operated in accordance with said control voltage for selectively associating one of the common equipments with switching apparatus.

9. In an automatic telephone system, a plurality of lines having individually assigned thereto different non-overlapping time positions in repetitive time position frames, comon equipment including pulse generating means for repetitively producing pulses in said time positions, switching apparatus directively controllable in accordance with the time positions individually assigned to said lines and utilizing said pulses for providing communication connections between said lines, and means responsive to an abnormal condition relating to the pulses appearing in any of said time positions for interrupting the supply of pulses from said common equipment to said switching apparatus.

10. The combination defined by claim 9 in which the interrupting means includes means for restoring the supply of pulses from the common equipment to the switching apparatus.

11. In an automatic telephone system, a plurality of lines having individually assigned thereto different non-overlapping time positions in repetitive time position frames, common equipment including pulse generating means for repetitively producing pulses in said time positions, electronic switching apparatus directively controllable in accordance with the time positions individually assigned to said lines and operated in part by said pulses for providing communication connections between different pairs of said lines, a voltage responsive network energized by said pulses, and signaling means controlled by said network and operated in response to the absense of any of said pulses in any of said time positions.

12. In an automatic telephone system, a plurality of lines having individually assigned thereto different non-overlapping time positions in repetitive time position frames, a first common equipment including pulse generating means for repetitively producing pulses in said time positions, said first common equipment also including normally operative output means, switching apparatus directively controllable in accordance with the time positions individually assigned to said lines and utilizing said pulses for providing communication connections between different pairs of said lines, an auxiliary common equipment including pulse generating means for repetitively producing pulses in said time positions, said auxiliary common equipment also having normally inoperative output means, and means responsive to an abnormal operating condition in said first common equipment for rendering the output means for the first equipment inoperative and for rendering the output means for the auxiliary equipment operative to supply pulses to the switching apparatus.

13. An automatic communication system comprising channel establishing means controlled by directing signals and using time spaced repetitive signals for establishing an individual communication channel, first means for providing time spaced repetitive signals, second means for providing time spaced repetitive signals, means for supplying said time spaced repetitive signals from said first means to said channel establishing means for use in establishing said communication channel, control means connected to said first means and responsive to the time spaced repetitive signals supplied by said first means, and means operated by said control means for rendering said second means effective to supply time spaced repetitive signals to said channel estalishing means.

14. In an automatic communication system, first means for supplying repetitive signals, second means for supplying repetitive signals, directively controlled electronic means for estalishing a communication path, means included in said electronic means and controlled by said repetitive signals from said first means for maintaining the continuity of the established communication path, and control means connected to said first and second means and responsive to the failure of said first means to supply repetitive signals to said electronic means for rendering said second means effective to supply repetitive signals to said electronic means.

15. In an automatic communication system, a plurality of lines, a first signal source providing signals, a second signal source providing signals, control means supplied with signals from said first signal source and operated incident to the extension of a call from a calling one of said lines for developing a control signal identifying said calling line that is distinct from signals identifying the others of said plurality of lines, electronic switching meas controlled at least in part by said control signal for extending a communication path from said calling line, and means responsive to the failure of said first signal source for rendering said second signal source effective to supply signals to said control means in place of said first signal source.

References Cited in the file of this patent

UNITED STATES PATENTS

| | | |
|---|---|---|
| 1,462,057 | Wold | July 17, 1923 |
| 1,664,225 | Robinson | Mar. 27, 1928 |
| 1,666,154 | Toomey | Apr. 17, 1928 |
| 1,974,328 | Bouwers | Sept. 18, 1934 |
| 1,992,908 | Crockoft | Feb. 26, 1935 |
| 2,077,179 | Moseley | Apr. 13, 1937 |
| 2,330,582 | Hepp | Sept. 28, 1942 |
| 2,379,069 | Dysart | June 26, 1945 |
| 2,490,833 | Ransom | Dec. 13, 1949 |
| 2,597,043 | Treadwell | May 10, 1952 |
| 2,649,505 | Ransom | Aug. 18, 1953 |
| 2,672,604 | Mills | Mar. 16, 1954 |
| 2,686,220 | Sziklai | Aug. 10, 1954 |
| 2,773,937 | Morris | Dec. 11, 1956 |